United States Patent
Chen et al.

(10) Patent No.: US 11,468,229 B2
(45) Date of Patent: Oct. 11, 2022

(54) DESCRIBING CHANGES IN A WORKFLOW BASED ON CHANGES IN STRUCTURED DOCUMENTS CONTAINING WORKFLOW METADATA

(71) Applicant: salesforce.com, inc., San Francisco, CA (US)

(72) Inventors: Nicholas Chun Yuan Chen, San Francisco, CA (US); George John Murnock, Jr., Firestone, CO (US); Michael Christopher Olson, Summit, WI (US); Karen Fidelak, Erie, CO (US)

(73) Assignee: salesforce.com, inc, San Francisco, CA (US)

( * ) Notice: Subject to any disclaimer, the term of this patent is extended or adjusted under 35 U.S.C. 154(b) by 0 days.

(21) Appl. No.: 15/930,369

(22) Filed: May 12, 2020

(65) Prior Publication Data
US 2021/0357584 A1   Nov. 18, 2021

(51) Int. Cl.
*G06F 17/00* (2019.01)
*G06F 40/197* (2020.01)

(52) U.S. Cl.
CPC .................. *G06F 40/197* (2020.01)

(58) Field of Classification Search
CPC .... G06F 40/197; G06F 16/1794; G06F 16/80; G06F 16/81; G06F 16/838; G06F 40/216; G06F 40/169; G06F 40/166
USPC ......................................................... 715/229
See application file for complete search history.

(56) References Cited

U.S. PATENT DOCUMENTS

| | | | |
|---|---|---|---|
| 7,730,478 B2 | 6/2010 | Weissman | |
| 8,196,030 B1 * | 6/2012 | Wang | G06K 9/00442 715/200 |
| 9,647,922 B2 | 5/2017 | Mortimore, Jr. et al. | |
| 10,296,440 B2 | 5/2019 | Gamble et al. | |
| 10,387,291 B2 | 8/2019 | Wunderlich et al. | |
| 10,397,309 B2 | 8/2019 | Wunderlich et al. | |
| 10,547,601 B2 | 1/2020 | Lipke et al. | |
| 10,586,025 B2 | 3/2020 | Chen et al. | |
| 10,891,357 B2 | 1/2021 | Chen et al. | |
| 2018/0129587 A1 | 5/2018 | Wunderlich et al. | |
| 2018/0217916 A1 | 8/2018 | Musser et al. | |
| 2018/0285426 A1 | 10/2018 | Chow et al. | |
| 2019/0050776 A1 * | 2/2019 | Chen | G06Q 10/0633 |
| 2019/0324895 A1 | 10/2019 | Wunderlich et al. | |

(Continued)

*Primary Examiner* — Jason T Edwards
(74) *Attorney, Agent, or Firm* — Nicholson, De Vos, Webster & Elliott, LLP

(57) ABSTRACT

A method performed by an electronic device includes retrieving, from a first computing environment, a first set of structured documents that contains metadata for a first version of a workflow to be performed by a workflow engine, the first version of the workflow including a first set of workflow elements. The method further including retrieving, from a second computing environment, a second set of structured documents. The method determines whether a rule is to be applied, based on one but not both of the first and second sets of structured documents including at least one section for a workflow element having a type to which the rule applies, and generating a description of a change in the second version of the workflow relative to the first version of the workflow.

20 Claims, 13 Drawing Sheets

(56) References Cited

U.S. PATENT DOCUMENTS

2019/0354636 A1* 11/2019 Hershowitz ......... G06F 16/1794
2020/0162561 A1* 5/2020 Milvaney ................ G06F 9/542

* cited by examiner

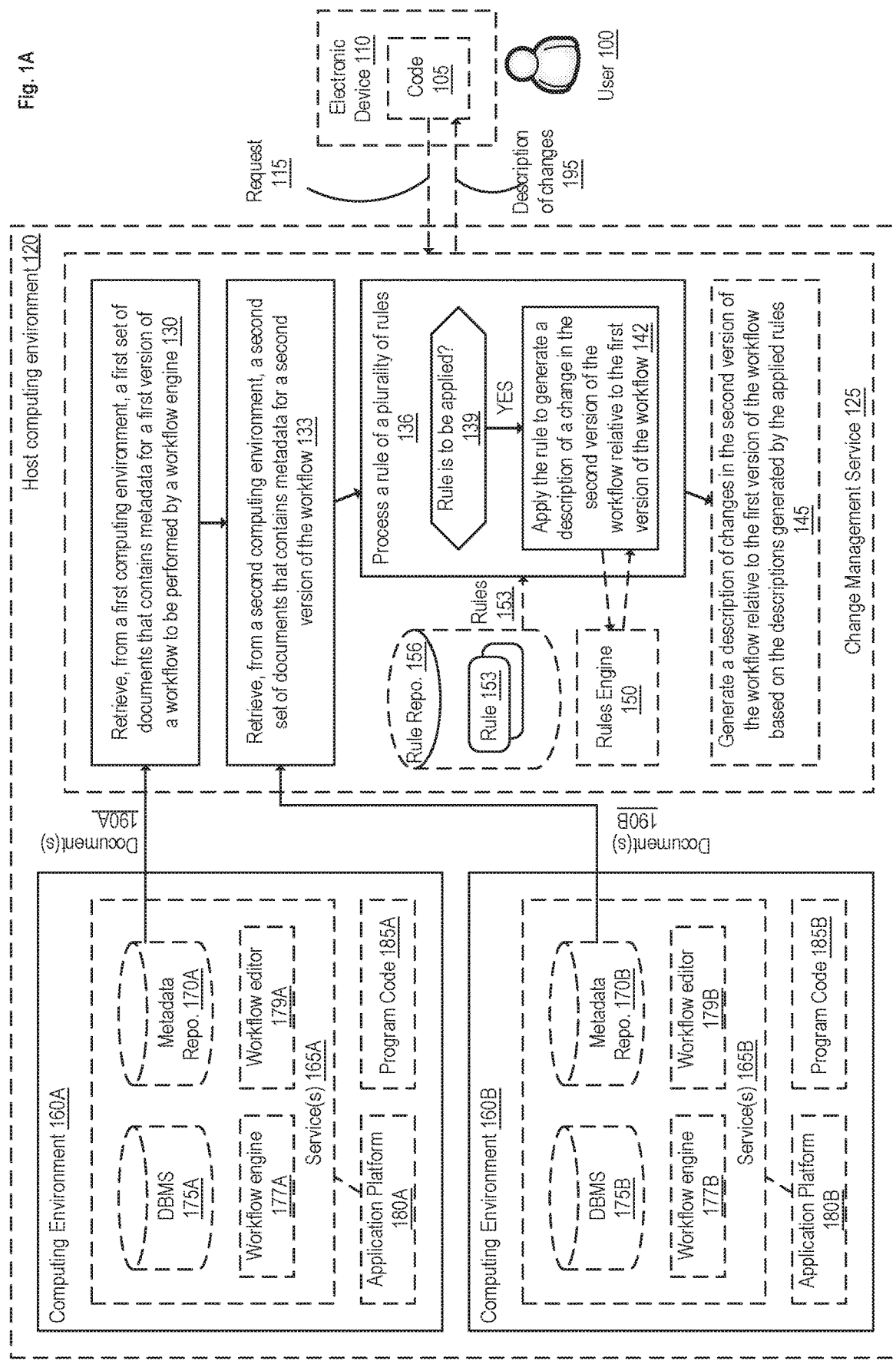

Fig. 2A

| Name 200 | Condition(s) 210 | Action(s) 220 | Description template 230 | |
|---|---|---|---|---|
| Flow Added | (1) The second set of XML documents includes at least one document that the first set of XML documents does not include; and (2) The filename of the at least one document matches a regular expression "*.flow-meta.xml" | Perform an XPATH query "/Flow/label" on the at least one document and assign a result of the query to the variable ${flow_name}. | A flow named "${flow_name}" was created | Rule 253A |
| Screen Added To Flow | (1) The second set of XML documents includes a document that the first set of XML documents includes; and (2) The filename of the document matches a regular expression "*.flow-meta.xml"; and (3) A result of an XPATH query "count(/Flow/screens)" performed on the document in the second set of XML documents is greater than a result of the XPATH query performed on the document in the first set of XML documents. | Perform an XPATH query "/Flow/screens/name" on the document in the first set of XML documents and assign a result of the query to the variable ${screens_1}. Perform the XPATH query on the document in the second set of XML documents and assign a result of the query to the variable ${screens_2}. Assign the unique elements in the variable ${screens_2} that are not in the variable ${screens_1} to a variable ${screen_name}. | A screen named "${screen_name}" was added to the flow named "${flow_name}" | Rule 253B |
| Field Added To Screen | (1) The second set of XML documents includes a document that the first set of XML documents includes; and (2) The filename of the document matches a regular expression "*.flow-meta.xml"; and (3) For at least one screen ${screen_name}, a result of an XPATH query "count(/Flow/screens/fields)" performed on the document in the second set of XML documents is greater than a result of the XPATH query performed on the document in the first set of XML documents. | Perform, for the at least one screen ${screen_name}, an XPATH query "/Flow/screens/name[text()=${screen_name}]/parent::screens/fields" on the document in the first set of XML documents and assign a result of the query to the variable ${fields_1}. Perform the XPATH query on the document in the second set of XML documents and assign a result of the query to the variable ${fields_2}. Assign names of unique elements in the variable ${fields_2} that are not in the variable ${fields_1} to a variable ${field_name}. | A field named "${field_name}" was added to the screen named "${screen_name}" | Rule 253C |
| Custom Object Added to Flow | (1) The second set of XML documents includes a document that the first set of XML documents does not include; and (2) The filename of the document matches a regular expression "*.object-meta.xml" | Apply an XPATH query "/CustomObject/name" to the document and assign a result of the query to the variable ${added_obj}. Apply another XPATH query "/CustomObject/description" to the document and assign a result of the another query to the variable ${obj_desc}. | A custom object named "${added_obj}" with description "${obj_desc}" was referenced by the flow named "${flow_name}" | Rule 253D |

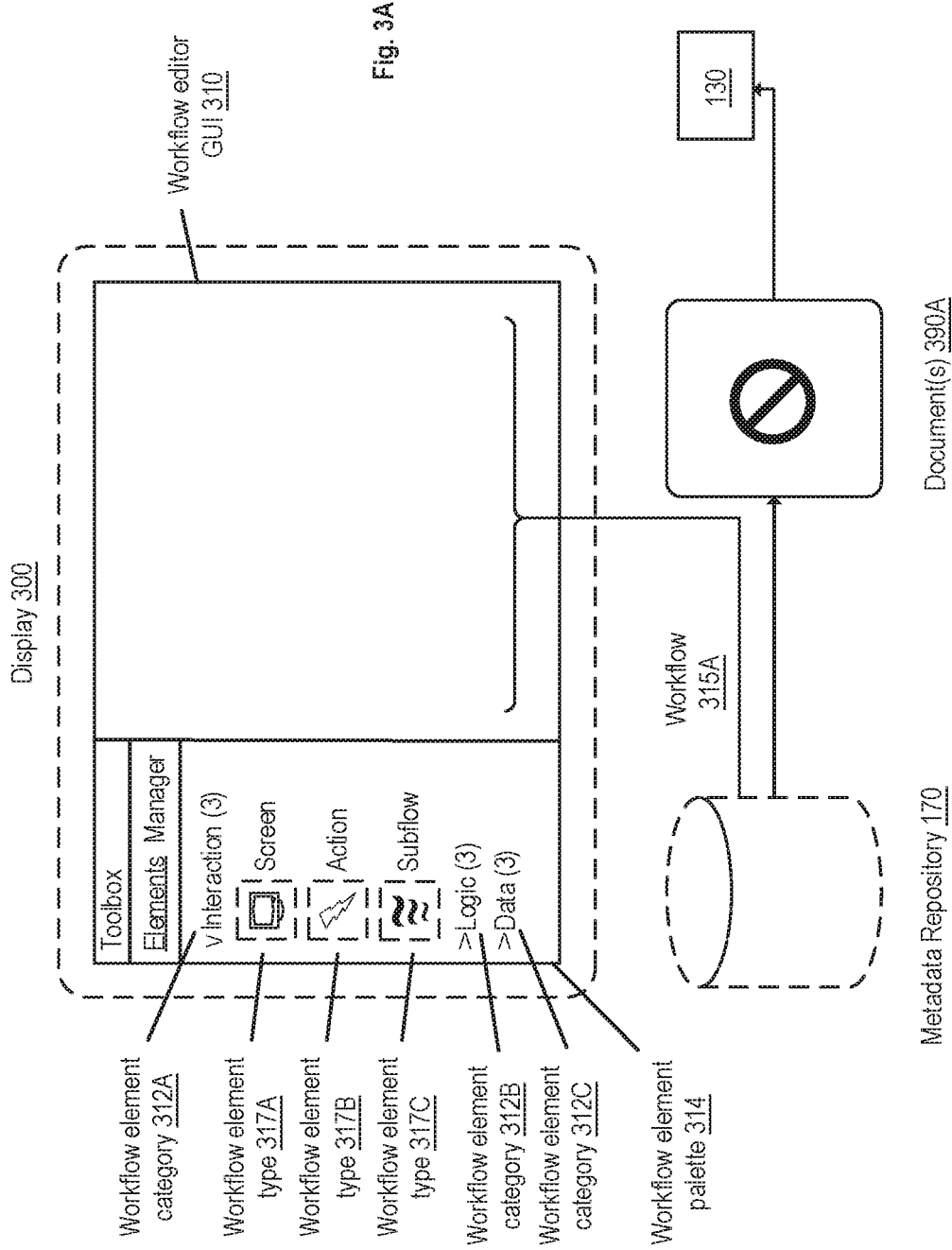

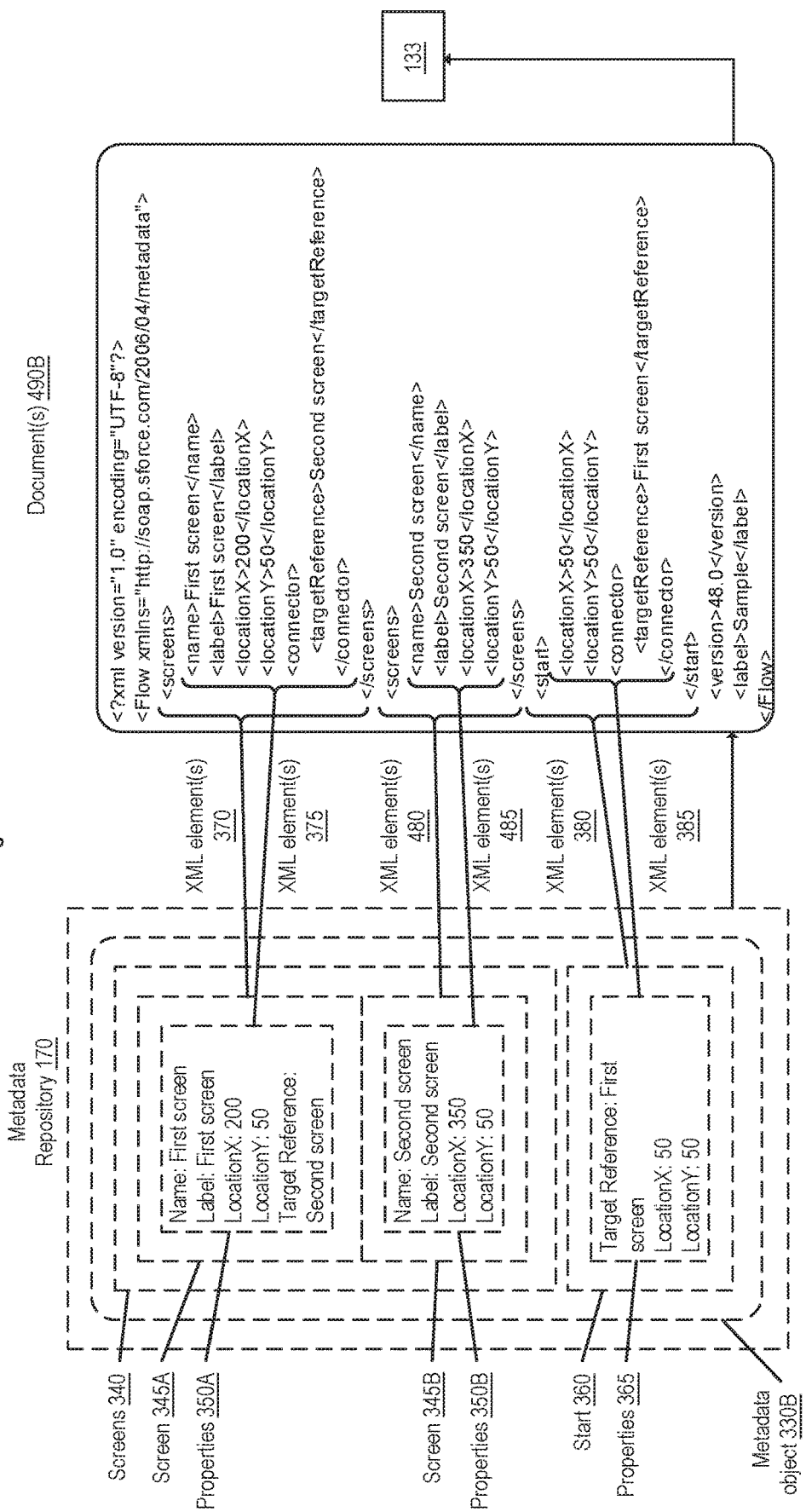

Document(s) 590B

```
<?xml version="1.0" encoding="UTF-8"?>
<Flow xmlns="http://soap.sforce.com/2006/04/metadata">
    <screens>
        <name>First screen</name>
        <label>First screen</label>
        <locationX>200</locationX>
        <locationY>50</locationY>
        <fields>
            <name>Name</name>
            <extensionName>flowruntime:name</extensionName>
            <fieldType>ComponentInstance</fieldType>
            <isRequired>true</isRequired>
        </fields>
    </screens>
    <start>
        <locationX>50</locationX>
        <locationY>50</locationY>
        <connector>
            <targetReference>First screen</targetReference>
        </connector>
    </start>
    <version>48.0</version>
    <label>Sample</label>
</Flow>
```

XML element(s) 375
XML element(s) 370
XML element(s) 595
XML element(s) 380
XML element(s) 385

Fig. 5B

DESCRIBING CHANGES IN A WORKFLOW BASED ON CHANGES IN STRUCTURED DOCUMENTS CONTAINING WORKFLOW METADATA

TECHNICAL FIELD

One or more implementations relate to the field of software change management; and more specifically, to describing changes in a workflow to be performed by an electronic device.

BACKGROUND ART

Software tools exist that allow a user to create a workflow via a graphical user interface (GUI). For example, a workflow builder may allow a user to create a workflow by dragging and dropping workflow elements from a palette, connecting workflow elements to other workflow elements, and editing properties of workflow elements in screens of the GUI. In the GUI, workflow elements may be represented by icons and/or text, and connections between workflow elements represented by lines with arrows that indicate a sequence in which the workflow elements are to be performed.

Metadata for a workflow can be contained in a structured document, such as a document containing eXtensible Markup Language (XML). Software tools exist that allow for comparing differences between two text documents (sometimes referred to as performing a "diff") and displaying the differences relative to the contents of one of the documents; e.g., showing the additions, deletions, or modifications of text in one of the documents relative to the other of the documents.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 1A is a block diagram that shows a system for describing changes in a workflow based on changes in documents containing workflow metadata, according to some example implementations.

FIG. 2A is a diagram that shows examples of rules to generate a description of changes in a version of a workflow relative to another version of the workflow, according to some example implementations.

FIG. 3A is a diagram that shows metadata, and one or more documents retrieved from a computing environment, for a workflow that does not include workflow elements or that does not exist, according to some example implementations.

FIG. 4B is a diagram that shows metadata, and one or more documents retrieved from a computing environment, for a workflow that includes two workflow elements, according to some example implementations.

FIG. 5B is a diagram that shows one or more documents retrieved from a computing environment for a workflow that includes one workflow element with edited properties, according to some example implementations.

DETAILED DESCRIPTION

Figure 1B:
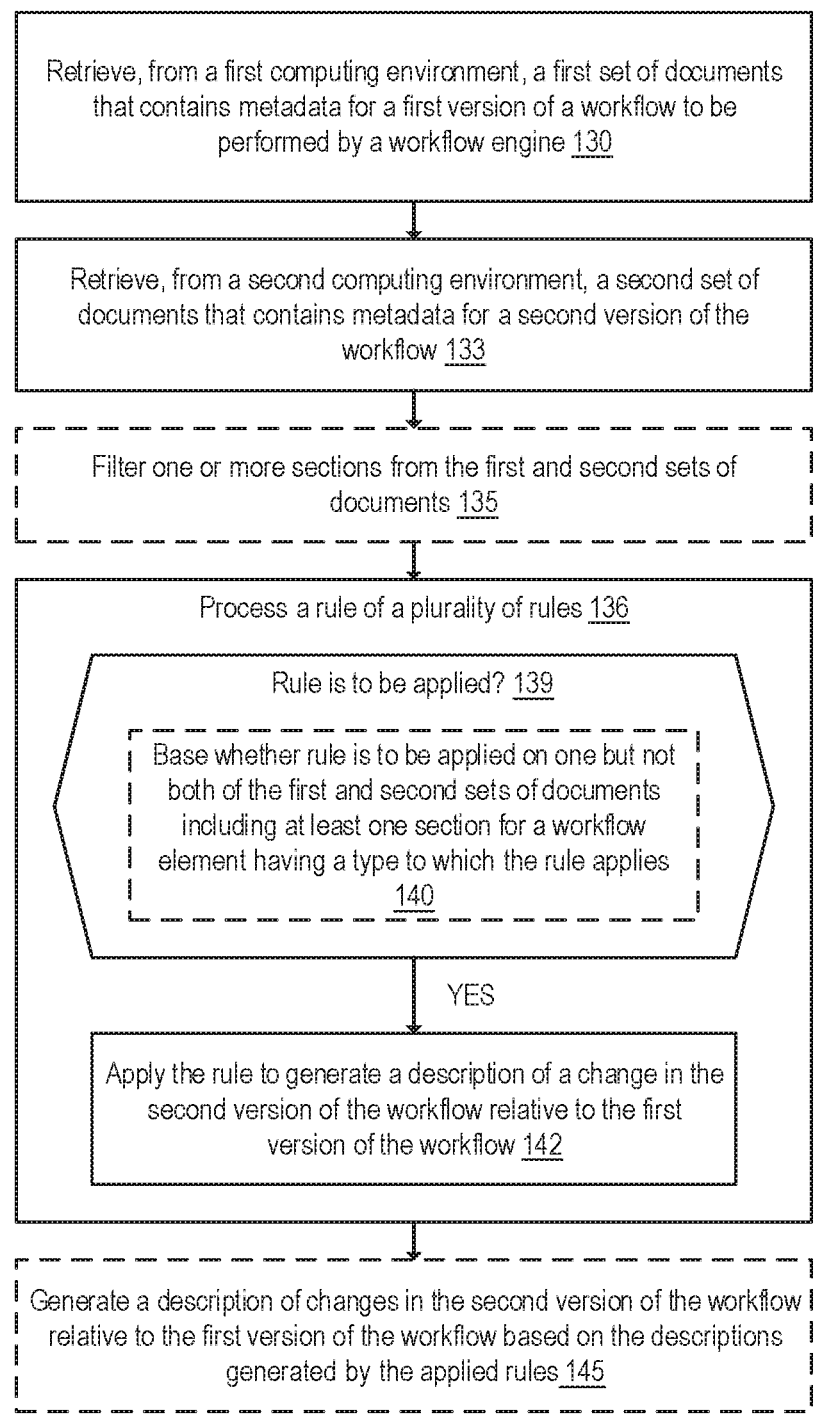
FIG. 1B is a flow diagram that shows a method for describing changes in a workflow based on changes in documents containing workflow metadata, according to some example implementations.

The following description describes implementations for describing differences between workflows and/or versions of a workflow (e.g., a first version of a workflow may be a modified to create a second version). Differences may relate to changes in a workflow relative to another workflow or to a previous version of the workflow. Implementations may describe differences and/or changes in a workflow based on differences in documents containing workflow metadata. As described herein, a workflow is a sequence of steps to be performed by a workflow engine executing on an electronic device. A workflow engine performs a workflow by executing instructions for the steps in the sequence. A workflow is comprised of workflow elements. A workflow element represents a step in a workflow, such as making a decision, performing an action, presenting a screen in a graphical user interface (GUI), creating a record in a database, etc. Differences between workflows (or versions of a workflow) may relate to differences between the sets of workflow elements that the workflows respectively include.

In one implementation, a workflow element can be represented in a GUI using an icon and/or a textual description of the workflow element. Implementations may support a user creating, editing, and/or viewing a workflow visually using a GUI (which may be referred to as a workflow editor and a workflow editor GUI). For example, a user may create and/or edit a workflow by dragging and dropping workflow elements from a palette, connecting workflow elements to other workflow elements, and editing properties of workflow elements in screens of the GUI. A GUI is a user interface (UI) that allows a user to interact with an electronic device through graphical elements, as opposed to other forms of user interface (e.g., a command-line interface). Allowing a user to create, edit, and/or view a workflow using a GUI allows users to create, edit, and/or view workflows without knowledge of or tools for programming. In turn, more users are able to create, edit, and/or view workflows.

Implementations may support representing workflows and/or workflow elements in other ways. In one implementation, a workflow element can be represented in terms of metadata. Metadata is data that describes other data; e.g., data that describes elements of a workflow (also referred to as workflow elements) to be performed by a workflow engine executing on an electronic device. Thus, metadata for a workflow may include metadata for the elements of the workflow. Metadata may be stored in different formats and in different ways. For example, one implementation may store metadata as one or more objects (e.g., stored as records in a database, objects in a metadata repository, documents in a filesystem, etc.).

Implementations may allow a workflow to be exported. For example, implementations may allow for retrieval of metadata for a workflow, such as in one or more documents and/or streams of data. The metadata for the workflow can then be used for different purposes, such as importing the metadata into a different environment, storing the metadata in a different system, performing the workflow, etc. Metadata for a workflow can also be used to compare a workflow with another workflow or with another version of the workflow; e.g., to describe differences between the two workflows. Implementations described herein may be described in the context of describing changes between versions of a workflow. It should be noted, however, that implementations described herein may also be used to describe differences between versions of a workflow, to describe differences between workflows (which may or may not be different versions of a workflow), to describe differences between workflow elements in workflows (or versions of a workflow), etc.

Describing Changes in Workflows

FIG. 1A is a block diagram that shows a system for describing changes in workflows based on differences in documents containing workflow metadata, according to some example implementations. FIG. 1A shows a user 100 using electronic device 110 that includes code 105. Electronic device 110 communicates via code 105 with host computing environment 120, which includes computing environment 160 and change management service 125. A computing environment includes hardware and software that provides a set of services (e.g., services 165) to one or more clients (e.g., electronic device 110).

The implementation shown in FIG. 1A includes computing environment 160A and computing environment 160B. In a computing environment 160, one or more service(s) 165 may be provided via an application platform 180. For example, implementations may allow a user 100, via application platform 180, to use a workflow editor 179 to create, edit, and/or view a workflow, to store metadata for the workflow in metadata repository 170, and/or to perform the workflow by workflow engine 177. Implementations may use database management system (DBMS) 175 to store data referenced by or used in one or more workflows, and/or program code 185 to materialize application data from metadata stored in metadata repository 170.

A computing environment 160 may include an application platform 180 (e.g., application platform 180A and application platform 180B), program code 185 (e.g., program code 185A and program code 185B), and service(s) 165 (e.g., service(s) 165A and service(s) 165B). Computing environment 160 may include a DBMS 175 (e.g., DBMS 175A and DBMS 175B); a metadata repository 170 (e.g., metadata repository 170A and metadata repository 170B); a workflow engine 177 (e.g., workflow engine 177A and workflow engine 177B); and/or workflow editor 179 (e.g., workflow editor 179A and workflow editor 179B). By way of example, computing environment 160A and computing environment 160B may respectively correspond to a testing and a production environment, to two testing environments, to two production environments, etc. Other implementations may include only one computing environment 160, and/or share one or more of the service(s) 165, application platform 180, and/or program code 185 amongst tenants in a multi-tenant system. Additionally, or alternatively, implementations may include none, some, or all of the services shown in a computing environment 160 and/or one or more different services. Implementations may also offer different configurations of computing environments 160 to different users 100 (or different organizations, business units, divisions, etc. to which the users 100 belong).

Implementations may also implement change management service 125 in different ways. In one implementation, change management system may be included in a computing environment 160 (e.g., in one or both of computing environment 160A and computing environment 160B). However, some implementations may provide change management service (or parts thereof) on electronic device 110 (or a different electronic device). Additionally, or alternatively, implementations may include one or more services of computing environment 160 on electronic device 110. For example, one implementation might provide one or more of service(s) 165 and change management service 125 on electronic device 110 as part of a workflow development environment. Implementations might include one or more of the blocks included in change management service 125 as part of another service (e.g., a metadata comparison engine). FIG. 1A is illustrative and not limiting.

Responsive to a trigger (e.g., user 100 selecting a user interface (UI) element in a GUI), electronic device 110 transmits request 115 to change management service 125. Request 115 is for a description of changes 195 in versions of a workflow. In one implementation, request 115 includes data to identify one or more workflows (or versions thereof); e.g., by filename(s), version number(s), identifier(s), etc.

Responsive to receiving request 115, block 130 is performed. In block 130, a first set of documents 190A is retrieved from a first computing environment 160A. A document 190 is an electronic record that stores data. A document 190 may be a structured document; i.e., a document that stores structured data. Examples of a structured document include an XML document (i.e., an electronic document that stores data in accordance or attempted accordance with a version of the XML specification or similar) or a document that stores data in another markup language (e.g., HyperText Markup Language (HTML)), a JavaScript Object Notation (JSON) document (i.e., an electronic document that stores data in accordance or attempted accordance with the ISO/IEC 21778:2017 standard or similar) or a document that stores data in another serialization language (e.g., YAML Ain't Markup Language (YAML)), etc. Implementations that support retrieving document(s) 190 that are structured documents facilitate querying metadata contained in the documents 190 in an efficient manner (e.g., as part of processing rules 153), compared to querying metadata contained in unstructured documents.

Document(s) 190A contain metadata for a first version of a workflow to be performed by a workflow engine 177. Some implementations support document(s) 190A being empty (e.g., if the first version of the workflow does not include workflow elements or does not exist). Document(s) 190 may be empty if the document(s) 190 do not contain metadata for a workflow, if the document(s) 190 contain metadata for an empty workflow, if the document(s) 190 do not contain data, etc. Implementations may support document(s) 190A including one or more documents, as described in more detail later herein. From block 130, flow passes to block 133.

In block 133, a second set of documents 190B is retrieved from a second computing environment 160B. Some implementations support document(s) 190B being empty (e.g., if the second version of the workflow does not include workflow elements or does not exist). Additionally, or alternatively, implementations may support document(s) 190B including one or more documents 190. Although FIG. 1A shows document(s) 190A being retrieved from metadata repository 170A in computing environment 160A, and document(s) 190B being retrieved from metadata repository 170B in computing environment 160B, this is illustrative and not limiting. For example, an implementation may retrieve document(s) 190A from a computing environment 160, and document(s) 190B from the same computing environment 160 (e.g., to compare workflows, or versions of a workflow, stored in a single computing environment 160). For another example, an implementation may retrieve document(s) 190 from a different component than a metadata repository 170 (e.g., from a filesystem, via application platform 180, etc.), generate document(s) 190 from data stored therein, and/or generate document(s) 190 otherwise (e.g., from a graphical representation of a workflow in workflow editor 179).

Implementations also support document(s) 190B including a different number of documents 190 than document(s) 190A. Implementations may support retrieving, from a computing environment 160, a set of documents 190 that contain metadata for a workflow in different arrangements of documents 190. In one implementation, a set of document(s) 190 retrieved from a computing environment 160 contain metadata for a workflow in a single document 190. In another implementation, a set of document(s) 190 include more than one document 190 that together contain metadata for a workflow. For example, in one implementation, respective documents 190 of the set of document(s) 190 may each contain metadata for a respective workflow element of the set of workflow elements included in the workflow. For another example, in one implementation, respective documents 190 of the set of document(s) 190 may each contain metadata for one or more workflow elements of a given type of workflow element of the set of workflow elements included in the workflow. For yet another example, in one implementation, one document 190 of the set of document(s) 190 may contain metadata for the set of workflow elements included in the workflow and one or more other documents 190 may contain metadata that is referenced by one or more of those workflow elements (e.g., metadata for one or more custom objects, described later herein). It should be noted, therefore, that the set of document(s) 190B and the set of document(s) 190A may include different numbers of documents; e.g., depending on the implementation, if the first and second version of the workflow include different numbers of workflow elements, if one but not both of the first and second versions of the workflow includes workflow element, if one but not both of the first and second versions of the workflow references other metadata (or references more types of metadata), if one but not both versions of the workflow includes a workflow element of a certain type, etc.

From block 133, flow passes to block 135. In block 135, one or more sections of the first and second documents are filtered. One or more sections may be filtered for various reasons, such as to facilitate applying rules 153 to the documents 190, to avoid unexpected behavior when applying rules 153, to avoid applying rules 153 to generate descriptions of changes that are not of interest to a user 100, etc. For example, one or both of the first set of document(s) 190A and the second set of document(s) 190B may include metadata that does not relate or relates only incidentally to workflows, that relates to internal features of the computing environment 160 from which the document(s) 190 were retrieved, that relate to the documents 190 themselves (e.g., document format, version, or other properties), etc. Filtering such sections of document(s) 190 may be beneficial for reasons such as described. Filtering such sections may also provide performance benefits (e.g., applying one or more rules 153 may require manipulating less data). From block 135, flow passes to block 136.

In block 136, a rule 153 of a plurality of rules 153 is processed to generate one or more descriptions of changes in the second version of the workflow relative to the first version of the workflow. A rule is a specification of a set of actions that, when performed, generate a specified output. For example, in one implementation, a rule might specify one or more operations to be performed on an XML document to identify content of one or more XML elements, and when performed, the rule might generate a description based on that content. For another example, in another implementation, a rule might specify one or more operations to be performed on a JSON object to identify values of one or more name-value pairs, and when performed, the rule might generate a description based on those values. Some implementations may include retrieving the plurality of rules to be processed, such as from rules repository 156.

In the implementation shown in FIG. 1A, block 136 includes block 139. Block 139 includes determining whether a rule 153 is to be applied. Whether a rule 153 is to be applied can be determined in different ways. In some implementations, determining whether a rule 153 is to be applied may be based on whether one or more conditions specified in the rule 153 are met. Referring to FIG. 1B, an implementation may include block 140 in block 139. In block 140, determining whether a rule 153 is to be applied is based on one but not both of the first sets of documents 190A and second sets of documents 190B including at least one section for a workflow element having a type to which the rule 153 applies. A workflow element may be categorized by type; e.g., by a type of operation that the workflow element represents. For example, a workflow element might have a type corresponding to a logical operation (e.g., making a decision, performing a loop, etc.), a data operation (e.g., creating, updating, deleting a record in a database, storing or retrieving an object in a cache, etc.), a user interaction operation (e.g., prompting a user 100 for input), etc. A document 190 may include a section for a given workflow element; e.g., an XML document may include an XML element for the workflow element (e.g., that corresponds to metadata for the workflow element); a JSON object may include a name-value pair for the workflow element, etc. The section for the workflow element may be associated with a type of that workflow element (e.g., a type of workflow element that displays a screen may have metadata included in a section that is identified as containing metadata for an element of that type, such as via an XML start-tag, a name of a name-value pair, a heading, etc.). Determining whether a rule 153 is to be applied before applying a rule 153 avoids applying a rule 153 indiscriminately; e.g., applying a rule 153 that cannot generate a description of a change in a workflow compared to another workflow, which in turn avoids waste of computing resources.

Responsive to determining that a rule 153 is not to be applied, the rule 153 is not applied to the first and second sets of documents 190. In some implementations, operations may be performed responsive to determining that a rule 153 is not to be applied. For example, implementations may log that the rule 153 is not to be applied, etc.

Responsive to determining that a rule 153 is to be applied, flow passes from block 139 to block 142. In block 142, the rule 153 is applied to generate a description of a change in the second version of the workflow relative to the first version of the workflow. Applying a rule 153 means causing the action specified by the rule 153 to be performed to generate the output specified by the rule 153. A rule 153 might be applied in various ways. For example, if a rule 153 includes code, applying the rule might include executing the code. For another example, if a rule includes expressions in a template language, applying the rule might include processing the template language (e.g., using a template engine). In one implementation, a rule 153 is applied using a rules engine 150. Some rules engines 150 may support determining whether a rule is to be applied (e.g., based on whether one or more conditions of the rule are met) in addition to applying a rule 153 (e.g., causing one or more action(s) specified by the rule 153 to be performed to generate output specified by the rule 153).

In some implementations, block 142 may include (1) performing an action defined in the rule on at least one of the first set of documents 190A to provide a first result; and (2) performing the action defined in the rule on at least one of the second set of documents 190B to provide a second result, where the description of the change in the second version of the workflow relative to the first version of the workflow is based on comparing the first result with the second result. For instance, implementations may support one or more rules 153 that are applied to XML, documents that contain metadata for a workflow. In such implementations, block 142 may include comparing a first result of performing an XPATH query on at least one of the first set of documents 190A (i.e., that contain metadata for a first version of a workflow) with a second result of performing the XPATH query on at least one of the second set of documents 190B (i.e., that contain metadata for a second version of the workflow). From block 136, flow passes to block 145.

In block 145, a description of changes 195 in the second version of the workflow relative to the first version of the workflow is generated, based on the descriptions generated by the applied rules 153. A description is information to describe, and may be textual (e.g., comprised of text) and/or visual (e.g., comprised of graphical elements other than text). A description of changes 195, based on the descriptions generated by the applied rules 153, may be generated in different ways. In one implementation, generating the description of changes 195 may include aggregating the descriptions generated by the applied rules 153. For example, in the case of the applied rules 153 generating textual descriptions, the textual descriptions may be added together to form one or more sentences or paragraphs of text; in the case of the applied rules 153 generating graphical descriptions, the graphical descriptions may be added together such that multiple icons or other graphical elements are to be displayed (e.g., to one or more UI elements in a workflow editor GUI). In one implementation, applied rules 153 may generate a description in an audio form (e.g., via text-to-speech, via pre-recorded audio clips, etc.) and aggregating the generated descriptions may include joining the descriptions. Examples of descriptions of changes in a version of a workflow relative to another version of the workflow are discussed later herein referring to FIG. 7A and FIG. 7B. In some implementations, after the description of changes 195 in the second version of the workflow relative to the first version of the workflow is generated, the description of changes 195 is transmitted to the electronic device 110 that issued the request 115 for the description of changes 195. Transmitting the description of changes 195 may include transmitting a textual description; additionally or alternatively, transmitting the description of changes 195 may include causing the description of changes 195 to be presented to the user 100, such as via a GUI (e.g., via a GUI for a workflow editor 179).

Generating a description of changes 195 provides benefits over generating a set of differences between the first set of document(s) 190A and the second set of documents 190B. For example, a workflow may be created and/or edited by a user 100 who is not familiar with the format and/or content of the document(s) 190 that contain metadata for the workflow. A description of changes 195 may be more meaningful to such a user 100 than a set of differences between the first set of document(s) 190A and the second set of documents 190B. For example, in one implementation, a user 100 may create, edit, and/or view a workflow using a workflow editor GUI (e.g., by dragging and dropping workflow elements from a palette, etc.); such a user 100 may be unfamiliar with the format and/or content of the document(s) 190 that contain metadata for the workflow. Further, such a user 100 may expect that differences between two versions of a workflow are displayed in the workflow editor GUI. Displaying a description of changes 195 in a workflow relative to another workflow is better suited to being displayed in a workflow editor GUI than a set of differences between documents 190 that contain metadata for the two workflows. For example, for a description of changes 195, a GUI workflow editor can identify workflow elements to which one or more of the changes relate.

Moreover, describing changes or differences in workflows based on differences in documents containing metadata provides benefits over describing changes based on the changes being made. An alternative to describing changes or differences in workflows based on differences in metadata includes describing changes or differences in workflows based on the changes made. For example, a workflow editor 179 may, for each change in a workflow, log the change together with metadata for the flow. A description of changes 195 in the workflow could then be based on the logged changes. However, this approach means that the description of changes 195 is tied to the logged changes. Also, this approach is not available if logged changes are not available (e.g., because the workflow is changed by another tool, by another user 100, the logged changes are lost, a computing environment 160 does not support logging changes, a computing environment 160 does not support logging changes with sufficient granularity, document(s) 190 that contain workflow metadata are compared without reference to the computing environment 160 that logged changes, etc.). For example, describing differences between versions of a workflow may occur based on document(s) 190 that are exchanged via email, where the provenance of the differences is not available. Describing changes or differences in workflows based on differences in documents containing metadata allows the changes or differences in the workflows to be inferred regardless of the tool used to create and/or edit a workflow.

Describing changes or differences in workflows based on logged changes may also introduce inaccuracies and/or inefficiencies in the description. For example, a user 100 may delete a workflow element to a workflow and then add back the workflow element to the workflow (e.g., by performing an undo operation). The deletion and addition of the workflow element may not represent a meaningful change in the workflow. However, describing changes in the workflow based on logged changes may redundantly describe the deletion and the addition of the workflow element. Describing changes or differences in workflows based on differences in documents containing metadata avoids such redundancy and/or inaccuracy. In turn, describing changes or differences in workflows based on differences in documents containing metadata may obviate logging changes, reduce data storage requirements, avoid generating redundant, inaccurate, and/or needlessly verbose descriptions of changes, etc.

Processing rules 153 to generate a description of changes 195 also provides advantages. For example, a rules-based approach provides an extensible and modular way to generate a description of changes 195 in a workflow. For example, multiple rules 153 may apply to a given type of workflow element and be applied to the first and second sets of documents 190, each of the rules generating a description of a change in the workflows for which the documents 190 contain metadata. To support an additional type of workflow element, a rule 153 can be added (e.g., to rules repository 156). To modify a description of a change in a workflow, a single rule 153 may be modified. This extensibility and modularity allow implementations to be adapted easily to generate descriptions of changes according to different needs. For example, implementations can be adapted to generate different textual descriptions (e.g., in different languages, with different word choice, etc.), to generate different graphical descriptions (e.g., different icons, different animations, different look-and-feel, etc.), to generate descriptions for new workflow elements or types of workflow elements, to fix errors in generating descriptions, etc. Implementations which use a rule-based approach such as described herein also provide technical advantages over other approaches. For example, processing a rule 153 allows for generating descriptions of changes in parallel, which would not be possible if the first and second sets of documents 190 were processed using a monolithic approach for generating descriptions of changes 195. Implementations may also support chaining rules 153; i.e., including as a condition of applying one rule 153, that another rule 153 is applied. Although chaining rules 153 can generate complexity, chaining rules 153 can offer performance benefits and allow for applying rules 153 in a specific order.

Examples of Rules

FIG. 2A is a diagram that shows examples of rules 153 to generate descriptions of changes in a version of a workflow relative to another version of the workflow, according to some example implementations. FIG. 2A shows rule 253A, rule 253B, rule 253C, and rule 253D. Each rule 253 includes a name 200 (e.g., to identify the rule 253), one or more condition(s) 210 (e.g., for determining whether the rule 253 is to be applied), one or more action(s) 220 (e.g., to be performed as part of applying the rule 253 to generate a description), and a description template 230 (e.g., for generating a description of a change in a version of a workflow relative to another version of the workflow). Implementations may include different sets of elements in rules 253. For example, one implementation may omit name 200; another implementation may include a version and/or a last modified date for rules 253; yet another implementation may include an identifier for a type of workflow element to which a rule 253 applies, etc. Moreover, implementations may include none, some, or all of the rules 253 shown and/or other rules 253; the rules 253 shown in FIG. 2A are illustrative and not limiting.

Example Rules for XML Documents

For purposes of example, the rules 253 shown in FIG. 2A are applicable to document(s) 190 that are XML documents. An XML document contains one or more XML elements. An XML element may or may not include content. An XML element that includes content begins with a start-tag and ends with a matching end-tag (e.g., the XML element with a value of "<greeting>Hello, world!</greeting>" starts with a start-tag with a value of "<greeting>"; ends with a matching end-tag with a value of "</greeting>"; and includes content with a value of "Hello, world!"). An XML element that does not include content may include an empty-element tag (e.g., "<greeting/>"). Each XML element has a type, identified by name, and may have a set of XML attributes. XML is a descriptive format, and thus well suited to illustrative examples such as the rules 253 shown. Implementations that support retrieving document(s) 190 that are XML documents provide advantages, such as that rules 253 and processing such rules 253 may use technologies for processing XML. However, XML is verbose compared to other formats, and thus XML documents may be of relatively larger size than documents 190 that contain metadata in other formats, amongst other considerations.

Addition of a Workflow

Rule 253A includes the value "Flow Added" for name 200 and represents a rule 253 to describe a workflow being added (e.g., a change in a workflow where a second version of the workflow includes a non-empty set of workflow elements and a first version of the workflow includes an empty set of workflow elements (i.e., the first version of the workflow is empty or nonexistent)). An example of processing a rule 253 such as rule 253A is discussed referring to FIG. 3A and FIG. 3B.

Rule 253A includes, for condition(s) 210, pseudocode describing two conditions: (1) the second set of documents 190B includes at least one document 190 that the first set of documents 190A does not include; and (2) the filename of the at least one document 190 matches a regular expression "*.flow-meta.xml." A filename is an identifier given to an electronic record (e.g., an alphanumeric string ending with a period and an extension), and a regular expression is a sequence of textual characters that define a pattern for matching strings of text. Thus, the second condition is that a document 190 in the second set of document(s) 190B but not in the first set of document(s) 190A has a filename ending with a value of "flow-meta.xml." Including a condition based on a filename of a document allows a rule 253 to be applied to only certain documents 190; e.g., documents with particular filenames (and thus which contain metadata for only particular workflow elements, types of workflow elements, or types of metadata) and/or filetypes (and thus which are in a filetype supported by the rule 253).

Rule 253A includes, for action(s) 220, pseudocode describing an action of performing an XPATH query "/Flow/label" on the at least one document 190 and assigning a result of the query to the variable ${flow_name}." An XPATH query is a query, written in the XML Path Language, for selecting XML elements in an XML document. Here, performing the XPATH query in the action 220 of rule 253A on the at least one document 190 will provide a result that includes the content of an XML element in the document 190 that has a start-tag with a value of "<label>" and whose parent XML element has a start-tag with a value of "<Flow>." The action 220 of rule 253A will also assign the result of the XPATH query to a variable named ${flow_name}, which is referenced by description template 230 of rule 253A.

Description template 230 of rule 253A includes the text "A flow named "${flow_name}" was created." In one implementation, applying the rule 253A to generate a description of a change in a second version of a workflow relative to a first version of the workflow would include the text "${flow_name}" being substituted with a value of the variable named ${flow_name}, to which the result of the XPATH query was assigned.

Addition of a Workflow Element

Rule 253B includes the value "Screen Added To Flow" for name 200 and represents a rule 253 to describe a workflow element that displays a screen being added to a workflow (e.g., a change in a workflow where a second version of the workflow includes a set of workflow elements that includes a workflow element that displays a screen, and a first version of the workflow includes a set of workflow elements that does not include that workflow element). An example of processing a rule 253 such as rule 253A is discussed referring to FIG. 4A and FIG. 4B.

Rule 253B includes, for condition(s) 210, pseudocode describing three conditions: (1) the second set of documents 190B includes at least one document 190 that the first set of documents 190A includes; and (2) the filename of the document 190 matches a regular expression "*.flow-meta.xml"; and (3) a result of performing an XPATH query "count(/Flow/screens)" on that document 190 in the second set of XML documents 190B is greater than a result of performing the XPATH query on that document 190 in the first set of XML documents 190A. Thus, the three conditions are that both the first set of documents 190A and second set of documents 190B include an XML document with a name ending in "flow-meta.xml," where the XML document in the second set of documents 190B contains a greater number of XML elements with a start-tag with a value of "<screens>" and whose parent has a start-tag with a value of "<Flow>" than the number of such XML elements contained in the XML document in the first set of documents 190A.

Rule 253B includes, for action(s) 220, pseudocode describing actions of: (1) performing an XPATH query "/Flow/screens/name" on the document 190 in the first set of documents 190A and assigning a result of the query to the variable ${screens 1}; (2) performing the XPATH query on the document 190 in the second set of documents 190B and assigning a result of the query to the variable ${screens_2}; and (3) assigning the unique elements in the variable ${screens_2} that are not in the variable ${screens_1} to a variable ${screen_name}." Here, the first action will assign to a variable named ${screen_1} a result of performing the XPATH query on the document 190 in the first set of documents 190A (i.e., the content of each XML element that has a start-tag with a value of "<name>" where the parent of the XML element has a start-tag with a value of "<screens>" and where the grandparent of the XML element has a start-tag with a value of "<Flow>"). The second action will assign to the variable named "${screens_2} a result of performing the query on the XML document in the second set of documents 190B. The third action will assign the unique elements in the variable ${screens_2} that are not in the variable ${screens_1} to a variable ${screen_name}, which is referenced by description template 230 of rule 253B.

Description template 230 of rule 253B includes the text "A screen named "${screen_name}" was added to the flow named "${flow_name}"." In one implementation, applying the rule 253B to generate a description of a change in a second version of the workflow relative to the first version of the workflow would include (1) the text "${screen_name}" being substituted with a value of the variable named ${screen_name}, and (2) the text "${flow_name}" being substituted with a value of the variable named ${flow_name}. Assigning a value to the variable ${flow_name} was described referring to action(s) 220 of rule 253A and omitted in relation to action(s) 220 of rule 253B for brevity. Also, it may be noted that the value of ${screen_name} may correspond to the names of more than one workflow elements to display screens that were added in the second version of the workflow relative to the first version of the workflow. Description template 230 for rule 253B refers to screens in the singular (i.e., "A screen . . . was added") for simplicity. It should be noted that, in some implementations, a description template 230 for rule 253B may (1) detect whether the variable named "${screen_name}" contains a single element or multiple elements; (2) if the variable contains a single element, use the text shown in FIG. 2A and substitute the variables as previously described; and (3) if the variable contains a multiple element, (a) use text such as "Screens named <#list ${screen_name} as ${screen}>${screen}</#list> were added to the flow named ${flow_name}"; and (b) where applying the rule 253B to generate a description of a change in a second version of the workflow relative to the first version of the workflow includes evaluating the function "<#list ${screen_name} as ${screen}>${screen}</#list>" to substitute it with a list of elements of the variable named ${screen_name}.

Different implementations may support processing a rule such as rule 253B in different ways. In contrast to implementations described, one implementation may pair the determining whether a rule 153 is to be applied and the processing the rule 153 responsive to determining that the rule 153 is to be applied. For example, a first set of document(s) 190A and second set of document(s) 190B might include several documents 190 that match the condition(s) 210 of a rule 253 such as rule 253B (e.g., both the first and second sets of document(s) 190 might include a document with a filename "filename1-flow-meta.xml" and a document with a filename "filename2-flow-meta.xml", where both (1) the document with the filename "filename1-flow-meta.xml" in the first set of documents 190A has a different number of "<screen>" XML elements than the document with the filename "filename1-flow-meta.xml" in the second set of documents 190B; and (2) the document with the filename "filename2-flow-meta.xml" in the first set of documents 190A has a different number of "<screen>" XML elements than the document with the filename "filename2-flow-meta.xml" in the second set of documents 190B). In determining whether rule 253 is to be applied, a first pair of documents, one from each of the first and second sets of documents 190, might be identified as satisfying the condition(s) 210 of the rule 253. The rule 253 could then be applied as to this pair of documents 190. In parallel, or sequentially, a second pair of documents might be identified as satisfying the condition(s) 210 of the rule 253, and the rule 253 applied as to the second pair of documents.

Modification of a Workflow Element

Rule 253C includes the value "Field Added To Screen" for name 200 and represents a rule describing a workflow element that displays a screen being modified, where the modification is to add a UI element to the screen to be displayed (e.g., a change in a workflow where a second version of the workflow includes a set of workflow elements that includes a workflow element that displays a screen, and a first version of the workflow includes a set of workflow elements that includes that workflow element, where the workflow element has a field added in the second version of the workflow). An example of processing a rule 253 such as rule 253C is discussed referring to FIG. 5A and FIG. 5B.

Rule 253C includes, for condition(s) 210, pseudocode describing three conditions: (1) the second set of documents 190B includes at least one document 190 that the first set of documents 190A includes; and (2) the filename of the document 190 matches a regular expression "*.flow-meta.xml"; and (3) for at least one screen, a result of performing an XPATH query "count(/Flow/screens/name[text( )=${screen_name}]/parent::screens/fields)" (where "${screen_name}" represents the name of the screen) on the document 190 in the second set of documents 190B is greater than a result of performing the XPATH query on the document 190 in the first set of documents 190A. Thus, the three conditions are that both the first set of documents 190A and second set of documents 190B include an document 190 with a name ending in "flow-meta.xml" where the document 190 in the second set of documents 190B contains an XML, element with a start-tag with a value of "<screens>," whose parent has a start-tag with a value of "<Flow>," with a greater number of child XML elements with a start-tag with a value of "<fields>" than the number of such child XML elements of such an XML element contained in the document 190 in the first set of documents 190A.

Rule 253C includes, for action(s) 220, pseudocode describing actions relative to the at least one screen identified from the condition(s) 210 of rule 253B being met: (1) performing an XPATH query/Flow/screens/name[text( )=${screen_name}]/parent::screens/fields" on the document 190 in the first set of documents 190A and assigning a result of the query to the variable named ${fields 1}; (2) performing the XPATH query on the document 190 in the second set of documents 190B and assigning a result of the query to the variable ${fields_2}"; and (3) assigning the unique elements in the variable ${fields_2} that are not in the variable ${fields_1} to a variable ${field_name}, which is referenced by description template 230 of rule 253C.

Description template 230 of rule 253C includes the text "A field named "${field_name}" was added to the screen named "${screen_name}"." In one implementation, applying the rule 253C to generate a description of a change in a second version of a workflow relative to a first version of the workflow would include (1) the text "${field_name}" being substituted with a value of the variable named ${field_name}; and (2) the text "${screen_name}" being substituted with a value of the variable named ${screen_name}. It should be noted that (1) more than one workflow element that displays a screen, represented by a variable ${screen_name}, may have a field added in the second version of the workflow relative to the first version of the workflow; and (2) the value of ${field_name} may correspond to the names of more than one fields added to a screen. On the former point, implementations may support generating a description based on the description template 230 of rule 253C for each screen to which a field was added. Regarding the latter point, the description template 230 for rule 253C refers to fields in the singular (i.e., "A field . . . was added") for simplicity. A description template 230 for rule 253C may also support generation of a description when more than one fields have been added to a screen, such as described in relation to rule 253B and multiple screens being added to a workflow.

Addition of a Custom Object

Rule 253D includes the value "Custom Object Added To Flow" for name 200 and represents a rule to describe a workflow being modified such that a second set of documents 190B that contains metadata for a second version of the workflow includes a different number of documents 190 than a first set of documents 190A that contains metadata for a first version of the workflow.

Rule 253D includes, for condition(s) 210, pseudocode describing two conditions: (1) the second set of document(s) 190B includes a document 190 that the first set of document(s) 190A does not include; and (2) the filename of the document 190 matches a regular expression "*.object-meta.xml." Thus, the second condition is that a document 190 in the second set of document(s) 190B but not in the first set of document(s) 190A has a filename ending with a value of "object-meta.xml." In one implementation, the document 190 with a filename ending in a value of "object-meta.xml" contains metadata for a custom object that is referenced in the second version of the workflow but not in the first version of the workflow.

Rule 253D includes, for action(s) 220, pseudocode describing actions of (1) performing an XPATH query "/CustomObject/name" on the document 190 and assigning a result of the query to the variable ${obj_name}; and (2) performing another XPATH query "/CustomObject/description" on the document 190 and assigning a result of the other query to the variable ${obj_desc}. Here, performing the XPATH query in the action 220 on a document 190 will provide a result that includes the content of an XML element in the document 190 that has a start-tag with a value of "<name>" and whose parent has a start-tag with a value of "<CustomObject>." The first action will further assign the result of the XPATH query to a variable named ${obj_name}, which is referenced by description template 230 of rule 253D. Performing the other XPATH query in the action 220 on a document 190 will provide a result that includes the content of an XML element in the document 190 that has a start-tag with a value of "<description>" and whose parent XML element has a start-tag with a value of "<CustomObject>." The second action will further assign the result of the other XPATH query to a variable named ${obj_desc}, which is referenced by description template 230 of rule 253D.

Description template 230 of rule 253D includes the text "A custom object named "${obj_name}" with description "${obj_desc}" was referenced by the flow named "${flow_name}"." In one implementation, applying the rule 253D to generate a description of a change in a second version of the workflow relative to the first version of the workflow would include (1) the text "${obj_name}" being substituted with a value of the variable named ${obj_name}, to which the result of the XPATH query was assigned; (2) the text "${obj_desc}" being substituted with a value of the variable named ${obj_desc}, to which the result of the other XPATH query was assigned; and (3) the text "${flow_name}" being substituted with a value of the variable named ${flow_name}. Assigning a value to the variable ${flow_name} was described referring to action(s) 220 of rule 253A and omitted in relation to action(s) 220 of rule 253D for brevity.

Deletion of a Workflow Element

Rules 253 have been describes that involve (1) addition of a workflow (e.g., addition of workflow elements in a version of the workflow relative to a version of the workflow without workflow elements); i.e., rule 253A; (2) addition of a workflow element to workflow; i.e., rule 253B, (3) modification of a workflow element in a workflow; i.e., rule 253C, and (4) a change in a workflow that results in additional documents being added to the set of documents 190 that contain metadata for the workflow. In the context of metadata for a workflow element being contained in an identifiable section of a document 190 (e.g., an XML, element, a name-value pair of a JSON object, a paragraph of a text file, etc.), addition of a workflow element of a given type in a version of the workflow relative to another version of the workflow can be inferred by the document 190 for the version of the workflow containing a greater number of sections for workflow elements of that type than the number of such sections contained by the document 190 for the other version of the workflow.

It should be noted that addition of a workflow element in a second version of a workflow relative to a first version of the workflow may be inferred as logically equivalent to the deletion of the workflow element in the first version of the workflow relative to the second version of the workflow. A rule 253 can be created to describe a removal (rather than an addition) of a workflow element of a given type in a second version of a workflow relative to a first version of a workflow with the following modifications relative to a rule 253 to describe an addition of such a workflow element: (1) modifying the condition(s) 210 of the rule 253 to include determining that a number of sections for workflow elements of the type in document 190 in the second set of documents 190B is less than (rather than greater than) the number of such sections in the corresponding document 190 in the first set of documents 190A; and (2) modifying the description template 230 for the rule 253 to describe a removal (rather than an addition) of the workflow element. Taking the example of rule 253B, a rule 253 to describe the removal of a workflow element that displays a screen can be created with the following modifications relative to rule 253B: (1) modifying the third condition 210 of rule 253 such that a result of an XPATH query "count(/Flow/screens)" applied to the document 190 in the second set of XML, documents 190B is less than (rather than greater than) a result of the XPATH query applied to the document 190 in the first set of XML documents 190A; and (2) modifying the description template 230 of rule 253B such that the description template 230 includes text such as "A screen named "${screen_name}" was removed from the flow named "${flow_name}.""

Example Rules for Other Documents

JSON and Other Structured Data

As mentioned previously, implementations may support retrieving documents 190 in other formats and may include rules 253 suited to such formats. For example, implementations may support retrieving a set of document(s) 190 from a computing environment 160 in a structured format such as JSON. Determining whether a rule 253 is to be applied to a JSON document may be based on whether one but not both of the first set of document(s) 190A and second set of document(s) 190B include at least one name-value pair for a workflow element having a type to which the rule 253 applies. For example, a rule 253A may include condition(s) 210 that include determining whether a JSON object for one version of a workflow includes a name-value pair in which the key has a value of "screen" (i.e., corresponding to a workflow element of type "screen"), where a JSON object for another version of the workflow does not include that name-value pair. Applying a rule 253 to a JSON document may include identifying the value of a name-value pair in the JSON object for the version of the workflow, and assigning that value to a variable referenced in a template from which a description of a change in the workflow is generated.

Processing Rules

Operations for Processing Rules

Figure 2B:
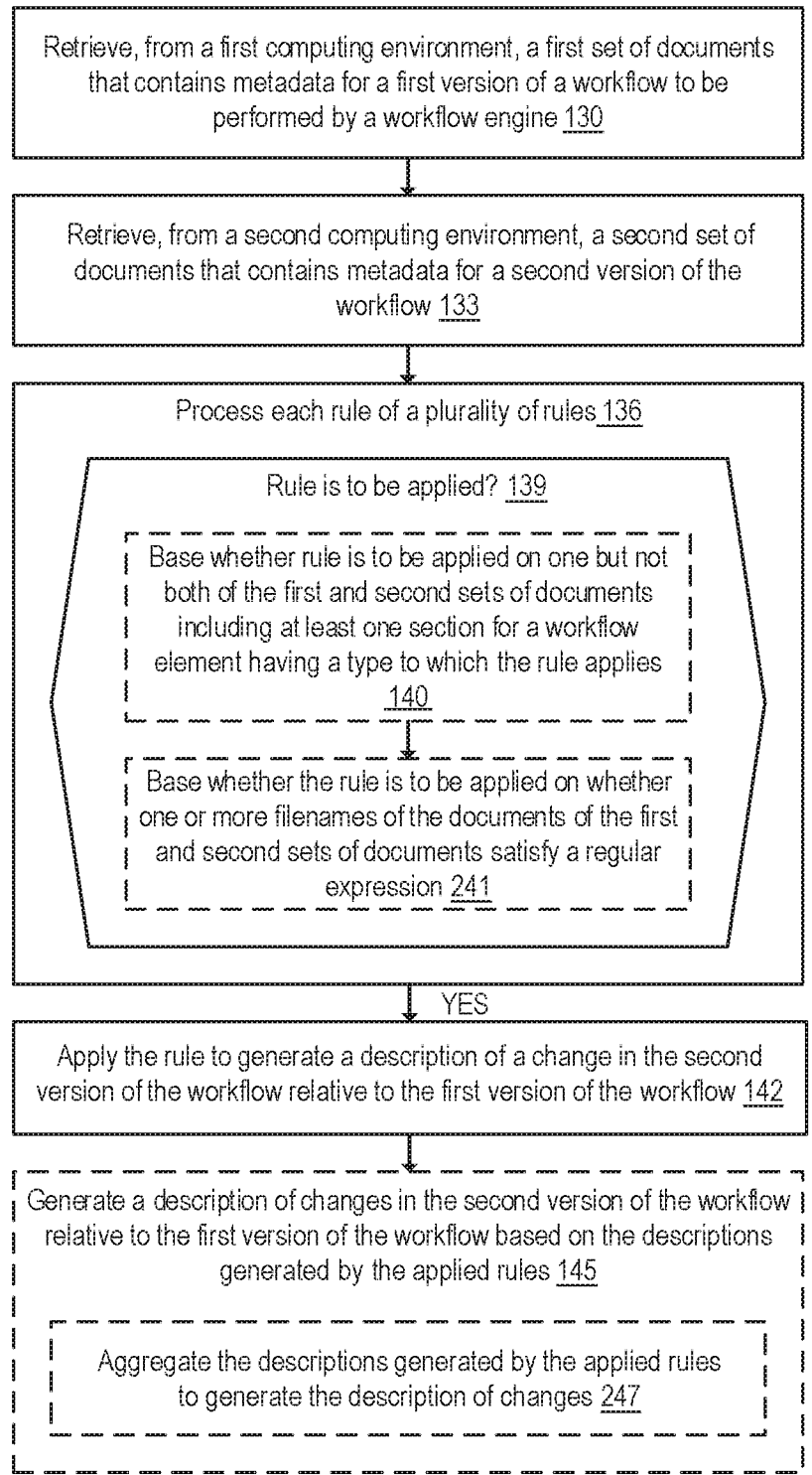
FIG. 2B is a more detailed flow diagram that shows a method for describing changes in a workflow based on changes in documents containing workflow metadata, according to some example implementations.

FIG. 2B is a more detailed flow diagram that shows a method for describing changes in a workflow based on changes in documents containing workflow metadata, according to some example implementations. Block 130, block 133, block 136, block 140, block 142, and block 145 have been described referring to FIG. 1B.

As shown in FIG. 2B, block 139 may include block 241. In block 241, determining whether a rule 153 is to be applied is based on whether one or more filenames of the documents 190 of the first set of document(s) 190A and the second set of document(s) 190B satisfy a regular expression. In one implementation, determining whether a rule 153 is to be applied may be based on whether one or more filenames of the first and second sets of documents 190 end in ".xml" (i.e., indicating that the documents 190 are XML documents) or end in ".json" (i.e., indicating that the documents 190 contain JSON). In another implementation, a filename of a document 190 may indicate a type of metadata contained by the document 190, a type of workflow element for which the document 190 contains metadata, a type of metadata object for which the document 190 contains metadata, etc. For example, a document 190 may end in "flow-meta.xml" (i.e., indicating that the document 190 is an XML document that contains metadata for a workflow), or end in "screen-meta.xml (i.e., indicating that the document 190 is an XML document that contains metadata for a workflow element that displays a screen), or in "object-meta.xml (i.e., indicating that the document 190 is an XML document that contains metadata for a custom metadata object), etc.

In some implementations, metadata for a workflow may be contained in several documents 190. For example, a set of documents 190 that contains metadata for a version of a workflow, such as those retrieved from a computing environment 160, may include more than one document 190. In one implementation, one document 190 may contain metadata for a workflow and its workflow elements, and one or more other documents 190 may contain metadata for other metadata objects referenced by the workflow and/or its workflow elements (e.g., a custom metadata object). In another implementation, a set of documents 190 that contains metadata for a version of a workflow may contain a document 190 for each workflow element or type of workflow element that the workflow includes. Thus, in such implementations, a filename of a document 190 may indicate the document's content. Determining whether a rule 153 is to be applied, based on whether one or more filenames of the documents 190 of the first set of document(s) 190A and the second set of document(s) 190B satisfy a regular expression, may assist determining whether the rule 153 is appropriate for the content(s) of one or more of the documents 190 and thus whether processing the rule 153 is appropriate for those document(s) 190.

FIG. 2B also shows block 247, that may be included in block 145 in some implementations. In block 247, the descriptions generated by the applied rules 153 are aggregated to generate the description of changes 195 in a second version of a workflow relative to a first version of the workflow. For an example referring to FIG. 2A, a rule 253A might be applied to generate the following description of a change in a second version of a workflow relative to a first version of the workflow: "A flow named "example flow" was created" and a rule 253B might be applied to generate the following description of a change in the second version of the workflow relative to the first version of the workflow: "A screen named "example screen" was added to the flow named "example flow." An implementation may aggregate such descriptions to generate a description of changes 195; e.g., to generate a description of changes 195 such as "A flow named "example flow" was created; and a screen named "example screen" was added to the flow." Additionally, or alternatively, an implementation might aggregate such descriptions to generate a description of changes 195 in the form of a graphical description. For example, a depiction of the second version of the workflow might be updated to include one or more graphical indications that the workflow named "example flow" was created, and that the workflow element named "example screen" was added to the workflow.

Other implementations may generate differently a description of changes 195. For example, an implementation might summarize a description of changes 195 that is a textual description; e.g., such that the summarized description of changes is more relevant to a user 100, to omit certain details, etc. Another implementation might translate a description of changes 195 into a different language. Yet another implementation might enrich a description of changes 195 to include additional information to that in the descriptions of changes generated by the applied rules 153. For example, implementations might enrich a description of changes 195 with information relating to who made changes to a workflow, when changes were made, or other relevant information.

Rule Implementation and Processing

A rule 253 can be expressed in different ways in different implementations. examples described have referred to pseudocode. In one implementation a rule 253 or part thereof (e.g., the condition(s) 210, the action(s) 220, etc.) can be implemented in code. Determining whether such a rule 253 is to be applied (e.g., based on whether condition(s) 210 of the rule 253 are met) and applying such a rule 253 (e.g., by performing the action(s) 220, and/or applying the description template 230, for the rule 253) includes executing or causing the execution of the code for the rule 253 (e.g., by a workflow engine 177 via a set of one or more processors of an electronic device). Additionally, or alternatively, a rule 253 or part thereof can be implemented in other ways; e.g., in a template language (such as Apache Freemarker, Apache Velocity, etc.), in a scripting language (e.g., Python, bash, etc.), in one or more queries (e.g., XPATH queries, Structured Query Language (SQL) queries, etc.), etc. Determining whether such rules 253 are to be applied and applying such rules 253 may include processing the rules 253 (or parts thereof) with a template engine, a script interpreter, a query processor, etc.

Example Workflow Changes

Addition of a Workflow

FIG. 3A is a diagram that shows metadata, and one or more documents retrieved from a computing environment, for a workflow that does not include workflow elements or that does not exist, according to some example implementations. FIG. 3A shows a display 300 that is displaying a workflow editor GUI 310. A computing environment 160 might provide a workflow editor GUI 310, such as part of a workflow editor 179, to allow a user 100 to create, view, and/or edit a workflow 315. In the example shown in FIG. 3A, workflow editor GUI 310 includes a workflow element palette 314. The workflow element palette 314 may include one or more workflow element types 317, which may be organized by one or more workflow element categories 312. The workflow element palette 314 allows a user 100 using the workflow editor GUI 310 to select one or more workflow element types 317 for which one or more workflow elements can be added to a workflow 315 via user input (e.g., by a user 100 selecting a corresponding icon and dragging the icon into a workflow 315).

Workflow element palette 314 includes examples of several workflow element types 317 under workflow element category 312A (shown with the name "Interaction (3)" to indicate that the workflow element types 317 in this category relate to user interaction, and that three workflow element types 317 are listed in this category): workflow element type 317A (represented with the text "Screen" and an icon showing a computer screen); workflow element type 317B (represented with the text "Action" and an icon showing a bolt of lightning); and workflow element type 317C (represented with the text "Subflow" and an icon showing curly lines). These examples of workflow element types 317 respectively represent: (1) for workflow element type 317A, a type of workflow element that represents that a screen to be displayed to a user 100 as part of a workflow 315; (2) for workflow element type 317B, a type of workflow element that represents that an action is to be performed as part of a workflow 315; and (3) for workflow element type 317C, a type of workflow element that represents that another workflow 315 is to be performed as part of a workflow 315 that references the other workflow 315. Workflow element palette 314 also includes (1) workflow element category 312B (shown with the name "Logic (3)" to indicate that the workflow element types 317 in this category relate to logical operations, and that three workflow element types 317 are listed in this category); and (2) workflow element category 312C (shown with the name "Data (3)" to indicate that the workflow element types 317 in this category relate to data operations, and that three workflow element types 317 are listed in this category). The workflow element types 317 categorized under workflow element category 312B and workflow element category 312C are show in UI that have been collapsed, such that the workflow element types 317 in these workflow element categories 312 are not visible.

Workflow editor GUI 310 also shows an empty or non-existent workflow 315A; i.e., workflow 315A does not include any workflow elements. Document(s) 390A are retrieved in block 130 (as previously described), such as from a metadata repository 170 in a computing environment 160 (e.g., computing environment 160A). Document(s) 390A are indicated with a circle with a diagonal slash to indicate that document(s) 390A are either empty documents or are not retrieved in block 130. In one implementation, workflow 315A includes an empty set of workflow elements and thus document(s) 390A do not contain metadata for workflow 315A. In other implementations, document(s) 390A may indicate that workflow 315A does not include workflow elements or that workflow 315A is yet to be created (e.g., document(s) 390A may include metadata indicating that workflow 315A does not include workflow elements).

Figure 3B:
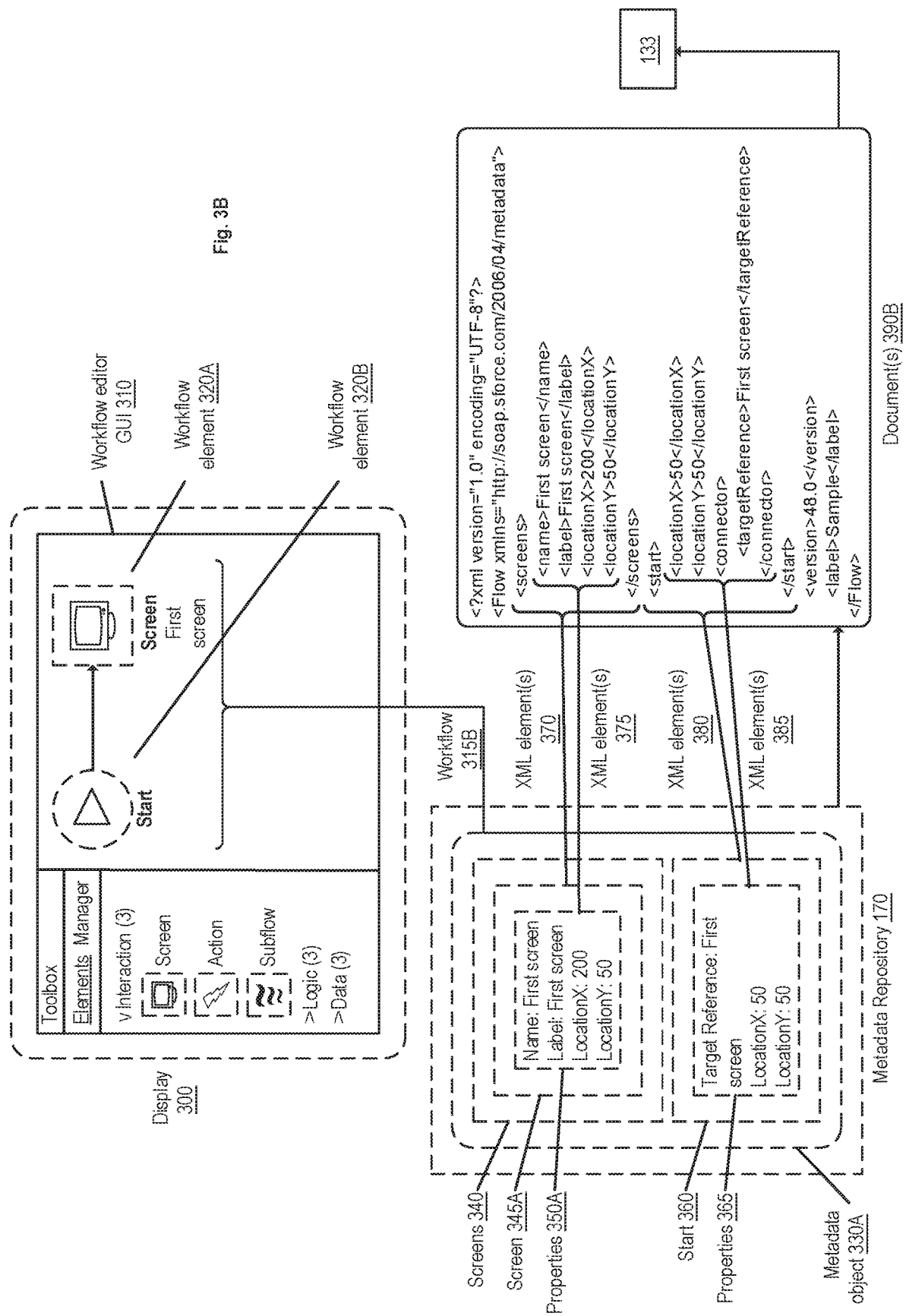
FIG. 3B is a diagram that shows metadata, and one or more documents retrieved from a computing environment, for a workflow that includes two workflow elements displayed in a graphical user interface, according to some example implementations.

FIG. 3B is a diagram that shows metadata, and one or more documents retrieved from a computing environment, for a workflow that includes two workflow elements displayed in a GUI, according to some example implementations. Specifically, workflow 315B is shown as including a set of workflow elements that include workflow element 320A and workflow element 320B. Workflow element 320A is of type "Screen" (i.e., workflow element type 317A, referring to FIG. 3A) as indicated by the bolded text "Screen" and has a name with a value of "First screen." Workflow element 320B is of type "Start" as indicated by the bolded text "Start" and does not have a name displayed. Implementations may include a workflow element such as workflow element 320B to indicate to a user 100 the first workflow element 320 to be performed in the workflow 315 (i.e., the one or more workflow elements 320 connected to workflow element 320B). The arrow from workflow element 320B to workflow element 320A indicates a sequence in which the workflow elements 320 are to be performed; i.e., a sequence in which workflow element 320B precedes workflow element 320A.

Metadata for workflow 315B is stored in metadata repository 170 as metadata object 330A. Metadata object 330A includes (1) metadata for workflow element 320B in the object corresponding to start 360, which includes properties 365 (shown as name-value pairs "Target Reference: First screen"; "LocationX: 50"; and "LocationY: 50"); and (2) metadata for workflow element 320A in the object corresponding to screen 345A, which includes properties 350A (shown as name-value pairs "Name: First screen"; "Label: First screen"; "LocationX: 200"; and "LocationY: 50"). Start 360 and properties 350A are included in the object corresponding to screens 340. Properties 365 of the object corresponding to start 360 indicate that (1) the workflow element 320B precedes a workflow element 320 named "First screen" (i.e., workflow element 320A) in a sequence of workflow elements 320 of workflow 315B; (2) the location of workflow element 320B in workflow editor GUI 310 is 50 units along an x-axis; and (3) the location of workflow element 320B in workflow editor GUI 310 is 50 units along a y-axis. Other implementations may include none, some, or all of these properties in properties 365, and/or other properties (e.g., properties relating to how a workflow element 320 is displayed in workflow editor GUI 310; how a workflow element 320 is performed when the workflow 315 including it is performed; a current version of the workflow element 320; an identifier for the type of workflow element, etc.). Properties 350A of the object corresponding to screen 345A indicate that (1) the workflow element 320A is named "First screen"; (2) the workflow element 320A has a label "First screen"; (3) the location of workflow element 320A in workflow editor GUI 310 is 200 units along an x-axis; and (4) the location of workflow element 320A in workflow editor GUI 310 is 50 units along a y-axis. Other implementations may include none, some, or all of these properties in properties 350A, and/or other properties.

Document(s) 390B are retrieved in block 133 (as previously described), such as from a metadata repository 170 in a computing environment 160 (e.g., computing environment 160B). Document(s) 390B contain metadata for workflow 315B as stored in metadata repository 170 as metadata object 330A. For example, metadata as stored in metadata object 330A is mapped to metadata contained in document 390B as follows: (1) screen 345A is mapped to XML element(s) 370 (with a start-tag with a value of "<screens>" and, as child XML elements, XML elements 375); (2) properties 350A is mapped to XML element(s) 375 (i.e., the XML elements with start-tags with values of "<name>"; "<label>"; "<locationX>"; and "<locationY>"); (3) start 360 is mapped to XML element(s) 380 (with a start-tag with a value of "<start>" and, as child XML elements, XML elements 385); and (4) properties 365 is mapped to XML element(s) 385 (i.e., the XML elements with start-tags with values of "<locationX>"; "<locationY>"; and "<connector>" (which has, as a child XML element, the XML element with a start-tag with a value of "<targetReference>")). Document(s) 390B also include (1) a root XML element with a start-tag with a value of "<Flow>"; (2) XML elements with start-tags with values of "<version>" and "<label>" which, together with XML elements 370 and XML element(s) 380, are child XML elements of the root XML element; and (3) an XML prolog (i.e., "<?xml version="1.0" encoding="UTF-8"?>").

Referring back to FIG. 2A and FIG. 2B, applying each rule 253 of rules 253A-D in block 136 results in the following operations being performed relative to document(s) 390A (as the first set of document(s) 190A) and document(s) 390B (as the second set of document(s) 190B). In block 139, determining whether rule 253A is to be applied results in determining that rule 253A is to be applied, based on condition(s) 210 being met.

In block 142, rule 253A is applied to generate a description of a change in the second version of the workflow (i.e., workflow 315B) relative to the first version of the workflow (i.e., workflow 315A). Specifically, (1) action(s) 220 of rule 253A is performed and a result "Sample" of performing the XPATH query "/Flow/label" on document(s) 390B assigned to the variable named "${flow_name}"; and (2) description template 230 evaluated, including substituting the result "Sample" for the variable named "${flow_name}" to generate the description of the change in workflow 315B relative to workflow 315A of "A flow named "Sample" was created."

Further, in block 139, determining whether rule 253B is to be applied results in determining that rule 253B is not to be applied, based on condition(s) 210 of rule 253B not being met. Also in block 139, determining whether rule 253C or rule 253D is to be applied results in determining that rule 253C and rule 253D is not to be applied, respectively based on condition(s) 210 of rule 253C and rule 253D not being met.

In block 145, a description of changes 195 in workflow 315B relative to workflow 315A is generated, based on the descriptions generated by the applied rules 253 (i.e., based on the description "A flow named "Sample" was created" generated by rule 253A).

Addition of a Workflow Element

Figure 4A:
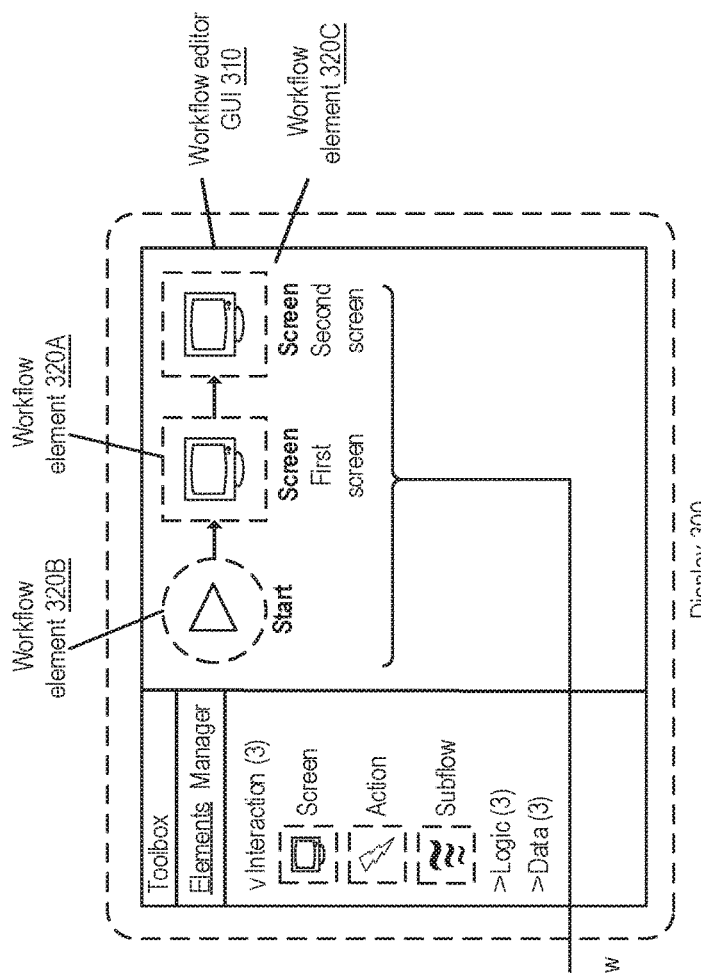
FIG. 4A is a diagram that shows metadata for a workflow that includes three workflow elements displayed in a graphical user interface, according to some example implementations.
Figure 4A:
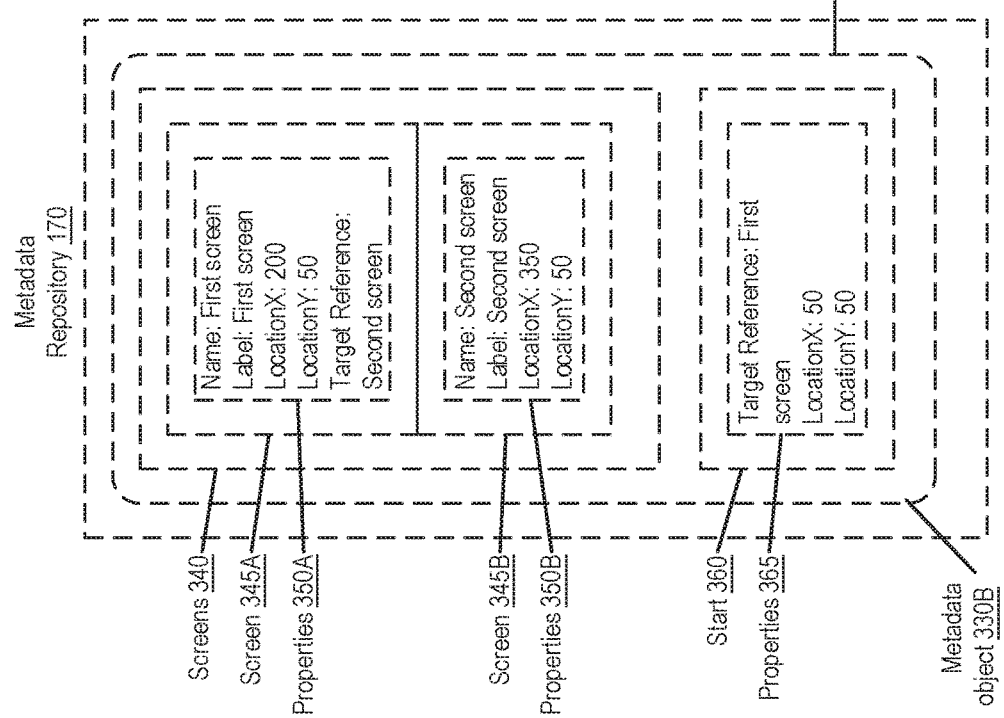

FIG. 4A is a diagram that shows metadata for a workflow that includes three workflow elements displayed in a GUI, according to some example implementations. FIG. 4A shows a display 300, which was discussed referring to FIG. 3A.

FIG. 4A also shows workflow editor GUI 310, which shows workflow 315C. Workflow 315C includes a set of workflow elements that includes workflow element 320A and workflow element 320B that were discussed referring to FIG. 4A. Workflow 315C also includes workflow element 320C of type "Screen" (i.e., workflow element type 317A, referring to FIG. 3A) as indicated by the bolded text "Screen" and has a name with a value of "Second screen." The arrow from workflow element 320B to workflow element 320A, and the arrow from workflow element 320A to workflow element 320C, indicates a sequence in which the workflow elements 320 are to be performed; i.e., a sequence in which workflow element 320B precedes workflow element 320A, which precedes workflow element 320C.

Metadata for workflow 315C is stored in metadata repository 170 as metadata object 330B. Metadata object 330B includes (1) metadata for workflow element 320B in the object corresponding to start 360; (2) metadata for workflow element 320A in the object corresponding to screen 345A; and (3) metadata for workflow element 320C in the object corresponding to screen 345B, which includes properties 350B (shown as name-value pairs "Name: Second screen"; "Label: Second screen"; "LocationX: 350"; and "LocationY: 50"). Screen 345A, start 360, properties 365, and properties 350A were described referring to FIG. 3B. In contrast with FIG. 3B however, properties 350A shown in FIG. 4A include an additional name-value pair "Target reference: Second screen." This additional name-value pair indicates that the workflow element (i.e., workflow element 320A) precedes a workflow element 320 named "Second screen" (i.e., workflow element 320C) in a sequence of workflow elements 320 of workflow 315C. Properties 350B of screen 345B indicate that (1) the workflow element 320C is named "Second screen"; (2) the workflow element 320C has a label "Second screen"; (3) the location of workflow element 320C in workflow editor GUI 310 is 350 units along an x-axis; and (4) the location of workflow element 320C in workflow editor GUI 310 is 50 units along a y-axis. Other implementations may include none, some, or all of the properties in properties 350B, and/or other properties.

FIG. 4B is a diagram that shows metadata, and one or more documents retrieved from a computing environment, for a workflow that includes three workflow elements, according to some example implementations. Specifically, FIG. 4B shows metadata object 330B, and document(s) 490B retrieved from a computing environment 160, for a workflow that includes three workflow elements (such as workflow 315C, including workflow elements 320A-C, shown in FIG. 4A).

In the example shown in FIG. 4B, document(s) 490B are retrieved in block 133, such as from a metadata repository 170 in a computing environment 160 (e.g., computing environment 160B). Document(s) 490B contain metadata for workflow 315C as stored in metadata repository 170 as metadata object 330B. For example, metadata as stored in metadata object 330B is mapped to metadata contained in document 490B as follows: (1) screen 345A is mapped to XML, element(s) 370; (2) properties 350A is mapped to XML element(s) 375; (3) start 360 is mapped to XML element(s) 380; and (4) properties 365 is mapped to XML element(s) 385. In contrast to FIG. 3B, XML element(s) 375 shown in FIG. 4B include an XML element with a start-tag with a value of "<connector>", which has a child XML element with a start-tag with a value of "<targetReference>." Also, document(s) 490B include metadata stored in screen 345B, mapped to XML element(s) 480 (with a start-tag with a value of "<screens>" and, as child XML elements, XML elements 485), and metadata stored in properties 350B, mapped to XML element(s) 485 (i.e., the XML elements with start-tags with values of "<name>"; "<label>"; "<locationX>"; and "<locationY>"). Document(s) 490B also include (1) a root XML element with a start-tag with a value of "<Flow>"; (2) XML elements with start-tags with values of "<version>" and "<label>" which, together with XML elements 370, XML element(s) 380, and XML element(s) 480, are child XML elements of the root XML element; and (3) an XML prolog (i.e., "<?xml version="1.0" encoding="UTF-8"?>").

Referring back to FIG. 2A and FIG. 2B, applying each rule 253 of rules 253A-D in block 136 results in the following operations being performed relative to document(s) 390B shown in FIG. 3B (as the first set of document(s) 190A) and document(s) 490B (as the second set of document(s) 190B).

In block 139, determining whether rule 253A is to be applied results in determining that rule 253A is not to be applied, based on condition(s) 210 of rule 253A not being met.

In block 139, determining whether rule 253B is to be applied results in determining that rule 253B is to be applied, based on condition(s) 210 of rule 253B being met. Specifically, the following conditions 210 of rule 253B are met: (1) the second set of documents 190B (i.e., document(s) 490B) include at least one document that the first set of document(s) (i.e., document(s) 390B) includes; (2) the filename of the at least one document of document(s) 490B satisfies the second condition of condition(s) 210 of rule 253A (for the sake of example); and (3) a result of an XPATH query "count(/Flow/screens)" performed on the document in the second set of XML documents (i.e., document(s) 490B) is the value "2" (since two child XML elements of the XML element with the start-tag with a value of "<Flow>" have start-tags with a value of "<screens>"), which is greater than the value of "1" for the result of the XPATH query performed on the document in the first set of XML documents (i.e., document(s) 390B, in which the XML element with the start-tag with a value of "<Flow>" has one child XML element with a start-tag with a value of "<screens>").

In block 142, rule 253B is applied to generate a description of a change in the second version of the workflow (i.e., workflow 315C) relative to the first version of the workflow (i.e., workflow 315B). Specifically, action(s) 220 of rule 253B are performed and description template 230 of rule 253B is evaluated. Performing action(s) 220 of rule 253B includes (1) performing an XPATH query "/Flow/screens/name" on the document in the first set of XML documents (i.e., document(s) 390B) and assigning the result of the query (i.e., the value of "First screen") to the variable ${screens_1}; (2) performing the XPATH query on the document in the second set of XML documents (i.e., document(s) 490B) and assigning the result of the query (i.e., the value of "First screen;Second screen") to the variable ${screens_2}; and (3) assigning the unique elements in the variable ${screens_2} that are not in the variable ${screens_1} to a variable ${screen_name} (i.e., a value of "Second screen"). Evaluating description template 230 of rule 253B includes substituting the value of the variable named "${screen_name}" to generate the description of the change in workflow 315C relative to workflow 315B of "A screen named "Second screen" was added to the flow named "Sample"."

Further, in block 139, determining whether rule 253C or rule 253D is to be applied results in determining that rule 253C and rule 253D is not to be applied, respectively based on condition(s) 210 of rule 253C and rule 253D not being met.

In block 145, a description of changes 195 in workflow 315B relative to workflow 315A is generated, based on the descriptions generated by the applied rules 253 (i.e., based on the description "A flow named "Sample" was created" generated by rule 253A).

Modification of a Workflow Element

Figure 5A:
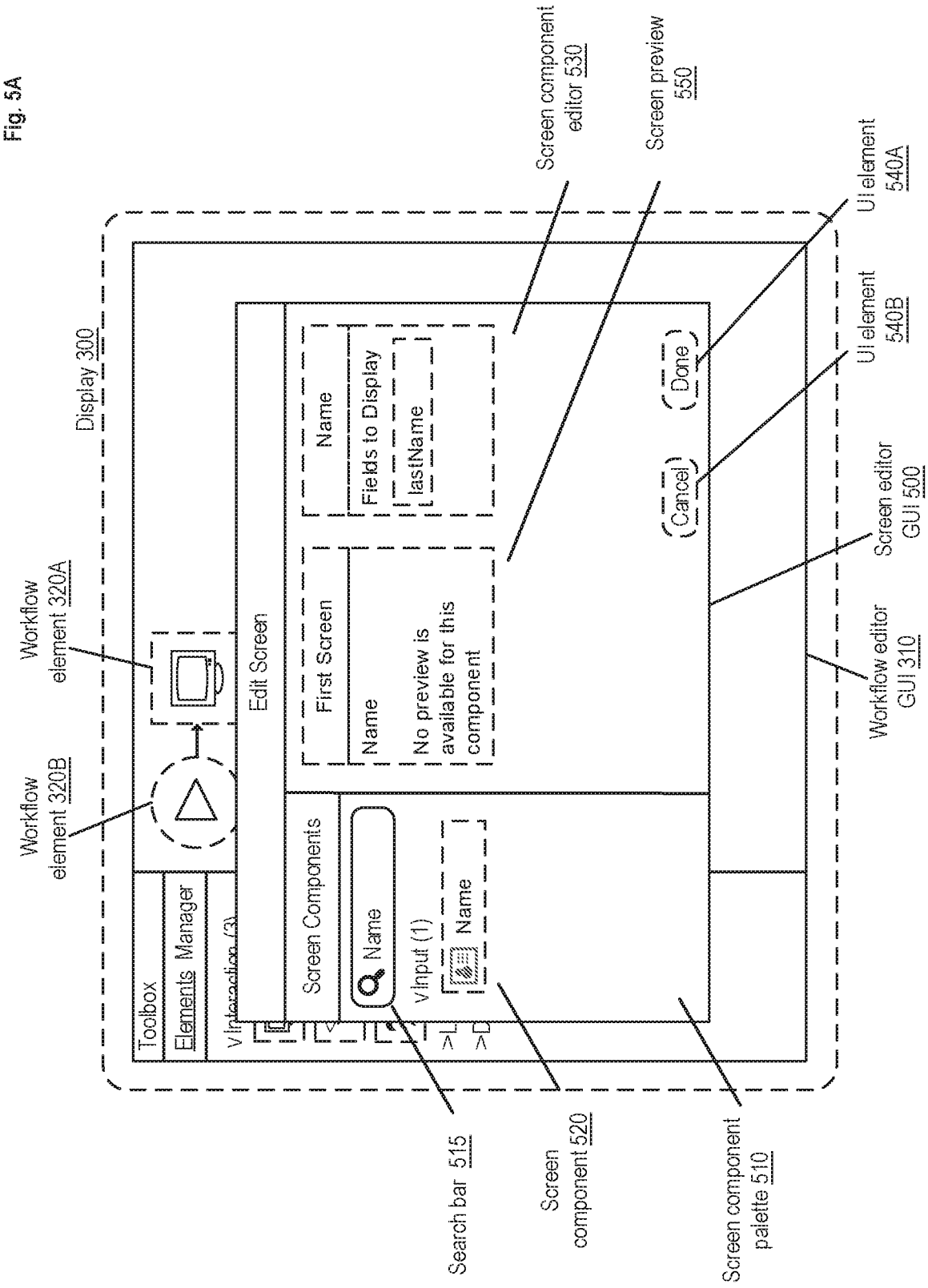
FIG. 5A is a diagram that shows a graphical user interface for editing properties of a workflow element, according to some example implementations.

FIG. 5A is a diagram that shows a GUI for editing properties of a workflow element, according to some example implementations. Specifically, FIG. 5A shows screen editor GUI 500 displayed in the workflow editor GUI 310. In one implementation, a user 100 may use screen editor GUI 500 to edit a screen that is to be displayed in connection with performing a workflow element 320 (e.g., of type "screen") in a workflow 315. Implementations may provide other GUIs for editing properties of other workflow elements 320, and/or a different screen editor GUI 500.

Screen editor GUI 500 includes screen component palette 510 that displays components of a screen and search bar 515 that allows a user 100 to enter text to filter screen components 520 shown in the screen component palette 510. As shown in FIG. 5A, the text "Name" has been entered in search bar 515 and responsive to the text being entered, the screen components 520 displayed in screen component palette 510 have been filtered such that screen component 520 (corresponding to the rectangular dashed box containing the text "Name" and an icon) is displayed under the text "Input (1)." Screen component 520 of type "Name" allows a user 100 to enter a name (e.g., a first name and/or last name) in a screen to be displayed as part of performing a workflow element 320 of a workflow 315. Screen editor GUI 500 includes other UI elements: screen component editor 530 to allow a user 100 to select and/or edit one or more fields (such as provided by screen component 520) to be displayed in the edited screen, and screen preview 550 to allow a user 100 to preview the screen that is currently being edited. Screen editor GUI 500 also includes UI element 540A and UI element 540B that allow a user 100 respectively to cancel editing a screen and close the screen editor GUI 500 (e.g., without saving changes to the screen), and to stop editing a screen and close the screen editor GUI 500 (e.g., with saving changes to the screen). In the example shown in FIG. 5A, screen editor GUI 500 has been displayed to edit properties of workflow element 320A, and workflow element 320A has been edited to add the property named "Name" and a corresponding field named "lastName."

FIG. 5B is a diagram that shows one or more documents retrieved from a computing environment for a workflow that includes one workflow element with edited properties, according to some example implementations. Specifically, FIG. 5B shows document(s) 590B, which may correspond to a set of one or more document(s) 190, retrieved from a computing environment 160, that contains metadata for a workflow 315B (shown in FIG. 3B) that includes a workflow element 320 with edited properties (e.g., workflow element 320A edited as shown in FIG. 5A).

Document(s) 590B include the following XML elements that have been described previously referring to document(s) 390B that contain metadata for workflow 315B: XML element(s) 370, XML element(s) 375, XML element(s) 380, and XML element(s) 385. Document(s) 590B also include XML element(s) 595 that contain metadata for a field of a workflow element 320; i.e., the screen component 520 (named "Name") shown in FIG. 5A. This metadata is mapped to XML element(s) 595 (i.e., the XML element(s) with a start-tag with values of "<fields>" and child XML elements with start-tags with values of "<name>"; "<extensionName>"; "<fieldType>"; and "<isRequired>").

Referring back to FIG. 2A and FIG. 2B, applying each rule 253 of rules 253A-D in block 136 results in the following operations being performed relative to document(s) 390B shown in FIG. 3B (as the first set of document(s) 190A) and document(s) 590B (as the second set of document(s) 190B).

In block 139, determining whether rule 253A is to be applied results in determining that rule 253A is not to be applied, based on condition(s) 210 of rule 253A not being met. Further, in block 139, determining whether rule 253B or rule 253D is to be applied results in determining that rule 253B and rule 253D is not to be applied, respectively based on condition(s) 210 of rule 253B and rule 253D not being met.

In block 139, determining whether rule 253C is to be applied results in determining that rule 253C is to be applied, based on condition(s) 210 of rule 253C being met. Specifically, the following conditions 210 of rule 253C are met: (1) the second set of documents 190B (i.e., document(s) 590B) include at least one document that the first set of document(s) (i.e., document(s) 390B) includes; (2) the filename of the at least one document of document(s) 590B satisfies the second condition of condition(s) 210 of rule 253C (for the sake of example); and (3) for the screen named "First screen," a result of an XPATH query "count(/Flow/screens/name[text( )=First screen]/parent::screens/fields)" performed on document(s) 590B is the value "1", which is greater than the value of "0" for the result of the XPATH query performed on the document(s) 390B.

In block 142, rule 253C is applied to generate a description of a change in the second version of the workflow (e.g., workflow 315B where workflow element 320A is edited as shown in FIG. 5A) relative to the first version of the workflow (e.g., workflow 315B). Specifically, action(s) 220 of rule 253C are performed and description template 230 of rule 253C is evaluated. Performing action(s) 220 of rule 253C includes (1) performing, for the screen named "First screen" an XPATH query "/Flow/screens/name[text( )=First screen]/parent::screens/fields" on the document in the first set of XML documents (i.e., document(s) 390B) and assigning the result of the query (i.e., " ") to the variable ${fields_1}; (2) performing the XPATH query on the document in the second set of XML, documents (i.e., document(s) 590B) and assigning the result of the query (i.e., XML element(s) 595) to the variable ${fields_2}; and (3) assigning the names of the unique elements in the variable ${fields_2} that are not in the variable ${fields_1} to a variable ${field_name} (i.e., a value of "Name"). Evaluating description template 230 of rule 253C includes (1) substituting the value of the variable named "${field_name}", and (2) substituting the value of the variable named "${screen_name}", to generate the description of the change in workflow 315B where workflow element 320A is edited as shown in FIG. 5A, relative to workflow 315B, of "A field named "Name" was added to the screen named "First screen"."

Another Modification of a Workflow Element

Figure 6:
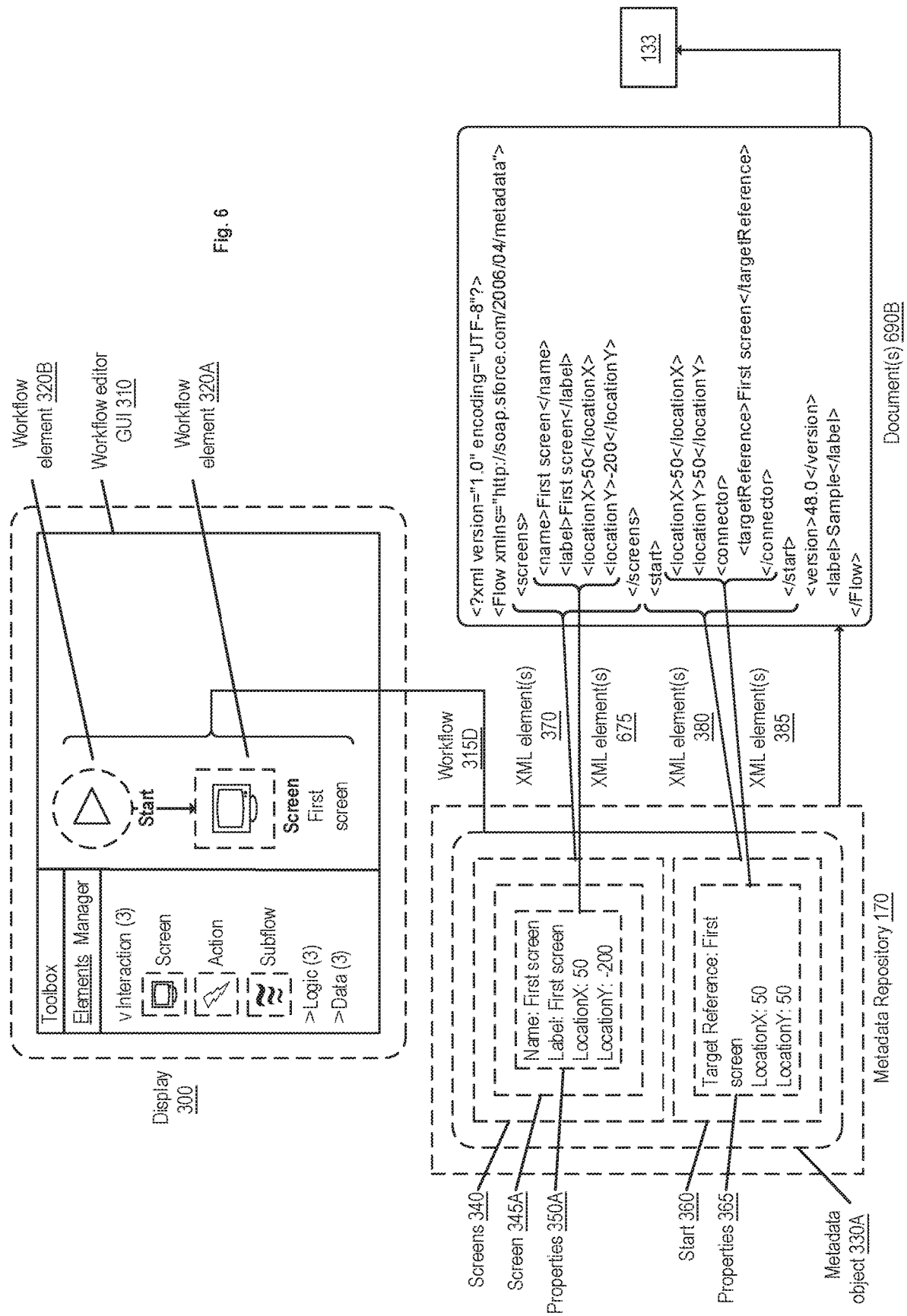
FIG. 6 is a diagram that shows metadata, and one or more documents retrieved from a computing environment, for a workflow that includes two workflow elements with a different arrangement in a graphical user interface, according to some example implementations.

FIG. 6 is a diagram that shows metadata, and one or more documents retrieved from a computing environment, for a workflow that includes two workflow elements with a different arrangement in a graphical user interface, according to some example implementations. Specifically, FIG. 6 shows workflow 315D that, like workflow 315B shown in FIG. 3B, includes workflow element 320A and workflow element 320B. In contrast to workflow 315B shown in FIG. 3B, FIG. 6 shows workflow element 320A displayed below, rather than to the right of, workflow element 320B in workflow editor GUI 310.

FIG. 6 also shows metadata object 330A, screen 340, screen 345A, properties 350A, start 360, and properties 365, discussed referring to FIG. 3B. However, properties 350A in FIG. 6 includes the name-value pairs "LocationX: 200" and "LocationY: −50" rather than the name value-pairs "LocationX:200" and "LocationY: 50" shown in FIG. 3B. FIG. 6 also shows document(s) 690B, which include XML element(s) 675 in contrast to XML element(s) 375 included in document(s) 390B shown in FIG. 3B. Compared to XML element(s) 375, XML element(s) 675 include an XML elements with start tags with values of "<locationX>" and "<locationY>" with respective content "50" and "−200", whereas XML element(s) 375 include XML elements with start tags with values of "<locationX>" and "<locationY>" with respective content "200" and "50."

A rule 253 to generate a description of a change in a second version of a workflow 315 relative to a first version of the workflow 315, where the change is repositioning two workflow elements 320, may include condition(s) 210 that a section in the corresponding document(s) 190 that contains metadata for a workflow element 320 in the workflow 315 indicates that the position of the workflow element 320 has changed between the two versions of the workflow 315. The action(s) 220 for such a rule 253 may include storing a name for such a workflow element 320 in a variable ${workflow_element_name}, and substituting the value of the variable in a description template 230 such as "A workflow element named ${workflow_element_name} was repositioned."

Descriptions of Changes

Figure 7A:
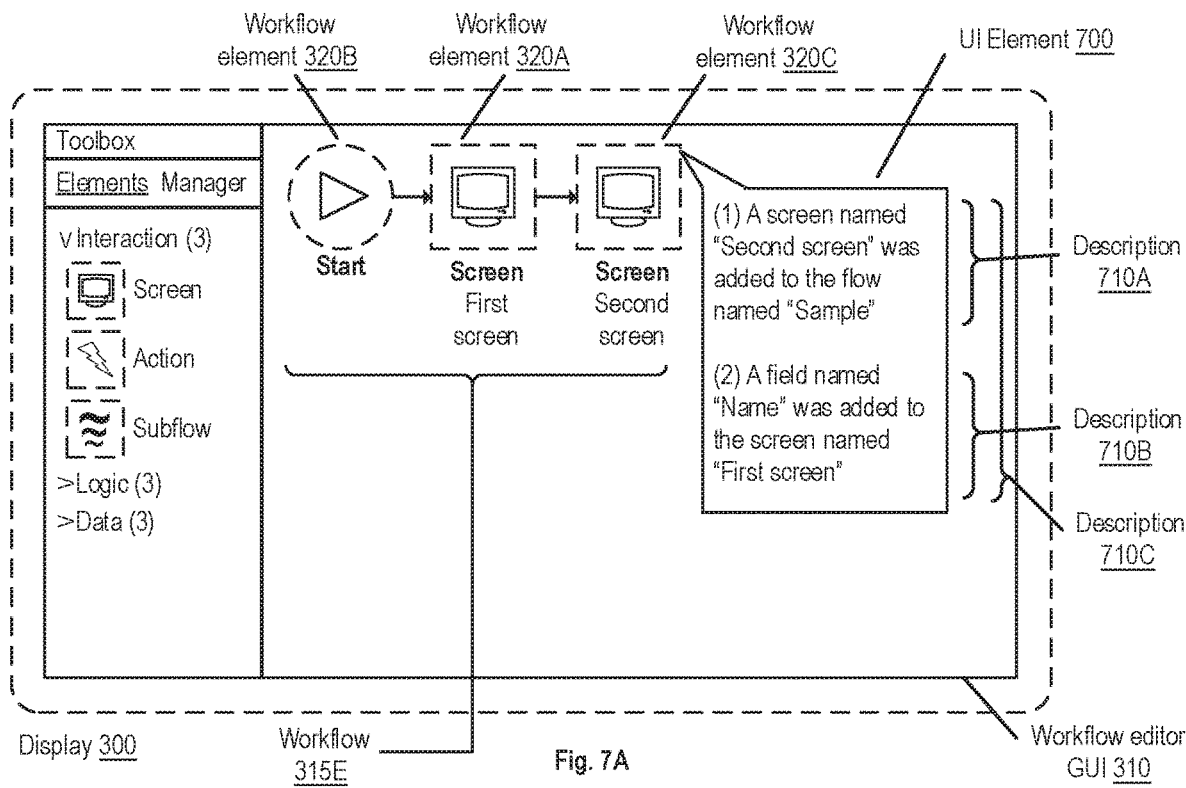
FIG. 7A is a diagram that shows descriptions of changes in a version of a workflow relative to another version of the workflow, according to some example implementations.

FIG. 7A is a diagram that shows descriptions of changes 195 in a version of a workflow relative to another version of the workflow, according to some example implementations. Specifically, FIG. 7A shows display 300 that is displaying a workflow editor GUI 310. Workflow editor GUI 310 displays workflow 315E which, like workflow 315C shown in FIG. 4A, includes workflow elements 320A-C. However, in contrast with workflow element 320C discussed referring to FIG. 4A, workflow element 320C shown in FIG. 7A has been modified to include a field named "Name" (such as described referring to FIG. 5A and FIG. 5B).

The operations shown in FIG. 2B can be performed to generate a description of changes 195 in workflow 315E relative to workflow 315C shown in FIG. 4A. For example, as discussed referring to FIG. 4B, rule 253B is applied to generate a description for a change in workflow 315E relative to workflow 315C of "A screen named "Second screen" was added to the flow named "Sample"" (shown in FIG. 7A as description 710A). Further, as discussed referring to FIG. 5B, rule 253C is applied to generate a description for a change of "A field named "Name" was added to the screen named "First screen"" (shown as description 710B). In block 145, a description of changes 195 in workflow 315E relative to workflow 315C is generated based on the descriptions generated by the applied rules (i.e., rule 253B and rule 253C). A description of changes 195 such as description 710C may be based on multiple descriptions; e.g., on both of description 710A and description 710B.

Implementations may present the generated description of changes 195 to a user 100 via a GUI such as workflow editor GUI 310. For example, a GUI may present description 710C to a user 100 in UI element 700. UI element 700 includes graphical and textual components. Textual components of UI element 700 include description 710A and description 710B. UI element 700 also includes the callout which contains the text of description 710A and description 710B. The description 710C, description 710B, description 710A, and UI element 700 are illustrative and not limiting. Different implementations may present a description of changes 195 to a user 100 via a GUI in different ways. For example, description 710A may be presented in a UI element that is shown close to the workflow element 320C to which description 710A relates, and description 710B may be presented in a UI element that is shown close to the workflow element 320A to which description 710B relates. Alternatively, description 710A, description 710B, and/or description 710C might be displayed in a separate UI element (e.g., a panel, a pop-up window, a modal dialog, etc.) to one or more UI element(s) representing the workflow element(s) 320 and/or workflow 315 to which the description(s) relate. Implementations might present a description of changes 195 in a GUI in which the workflow elements 320 and/or workflow 315 are not displayed.

Presenting a description of changes 195 provides numerous advantages. For example, a user 100 can contextualize a description of changes 195 that refers to one or more workflow elements 320 when those workflow elements 320 are displayed simultaneously with the description of changes 195. A user 100 can easily review changes described in a description of changes 195 presented in a GUI such as workflow editor GUI 310. Presenting a description of changes 195 may also be useful in different applications. For example, a description of changes 195 may be presented to a user 100 as part of the user 100 deploying a workflow 315 to a computing environment 160. In one situation, a user 100 might wish to deploy an updated version of a workflow 315 to a computing environment 160 in which an existing version of the workflow 315 is deployed. In deploying the updated version, the user 100 might be presented with a description of changes 195 in the existing version of the workflow 315 relative to the updated version of the workflow 315; e.g., to validate the deployment of the updated version. Presenting the description of changes 195 to the user 100 in this context assists the user 100 in validating the changes in the updated workflow 315 relative to the existing version.

Figure 7B:
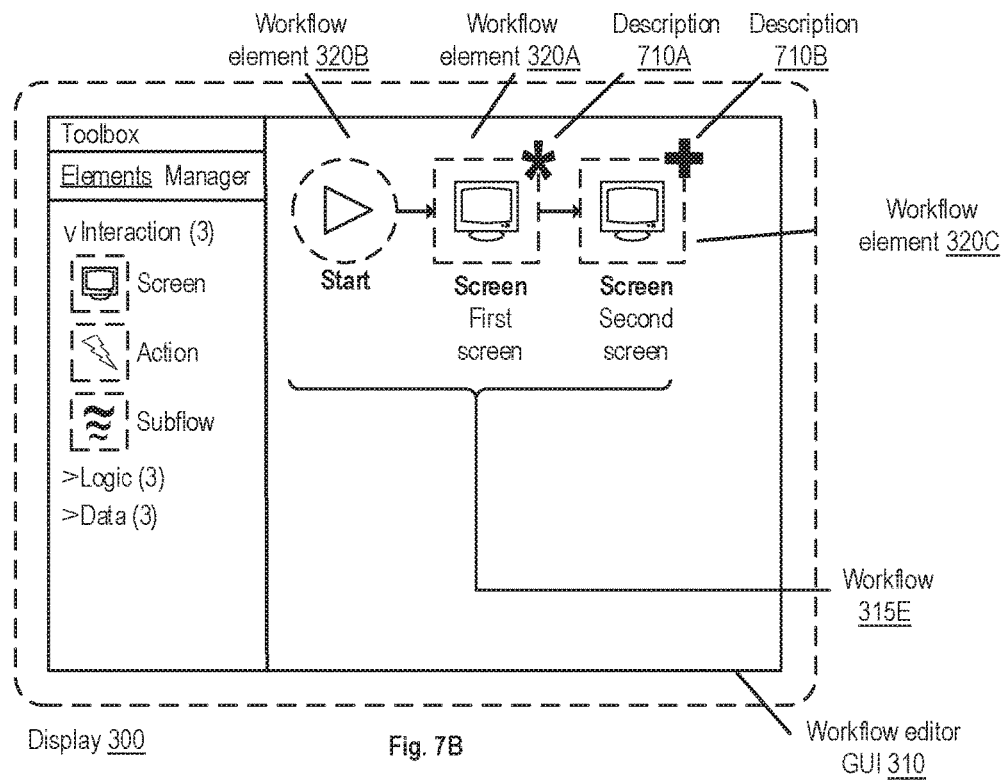
FIG. 7B is another diagram that shows descriptions of changes in a version of a workflow relative to another version of the workflow, according to some example implementations.

FIG. 7B shows another example of descriptions of changes in a version of a workflow 315 relative to another version of the workflow 315. In contrast to FIG. 7A, FIG. 7B shows description 710A as an icon (an asterisk) associated with workflow element 320A to which description 710A relates, and description 710B as an icon (an addition sign) associated with workflow element 320C to which description 710B relates. The icon corresponding to description 710A indicates that workflow element 320A was modified in workflow 315E relative to the workflow with which workflow 315E is being compared. The icon corresponding to description 710B indicates that workflow element 320C was added in workflow 315E relative to the workflow with which workflow 315E is being compared. Thus, implementations may generate graphical descriptions of changes, and/or a graphical description of changes 195, to be presented to a user 100. Additionally, or alternatively, implementations may generate and present to a user 100 descriptions of changes, and/or a graphical description of changes 195, that are of both a textual and a graphical nature. Taking the example of FIG. 7B, an implementation may present a user 100 a graphical description (such as an icon) that, responsive to input from a user 100 (e.g., a keystroke, mouse click, mouse hover, voice command, etc.), presents to the user 100 a textual description. The textual and graphical descriptions may provide the user 100 with the same or different information. For example, the textual description might present in words the information presented by the graphical description or may provide more information that presented by the graphical description. Additionally, or alternatively, an implementation may provide a user 100 with a description of changes 195 in an audio format (e.g., for improved accessibility).

Although implementations are described that provide a description of changes 195 to a user 100 in a GUI, it should be noted that a description of changes 195 need not be provided in a GUI. For example, implementations may provide a description of changes 195 in a file (e.g., a text file, an image file, an audio file, etc.), in one or more records in a database, in payloads of events in an event messaging platform, etc.

Example Electronic Devices and Environments

Electronic Device and Machine-Readable Media

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices (also referred to as devices) are designed for and/or used for a variety of purposes, and different terms may reflect those purposes (e.g., user devices, network devices). Some user devices are designed to mainly be operated as servers (sometime referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, etc.). The software executed to operate a user device (typically a server device) as a server may be referred to as server software or server code), while the software executed to operate a user device (typically a client device) as a client may be referred to as client software or client code. A server provides one or more services to (also referred to as serves) one or more clients.

The term "user" refers to an entity (e.g., an individual person) that uses an electronic device, and software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 8A:
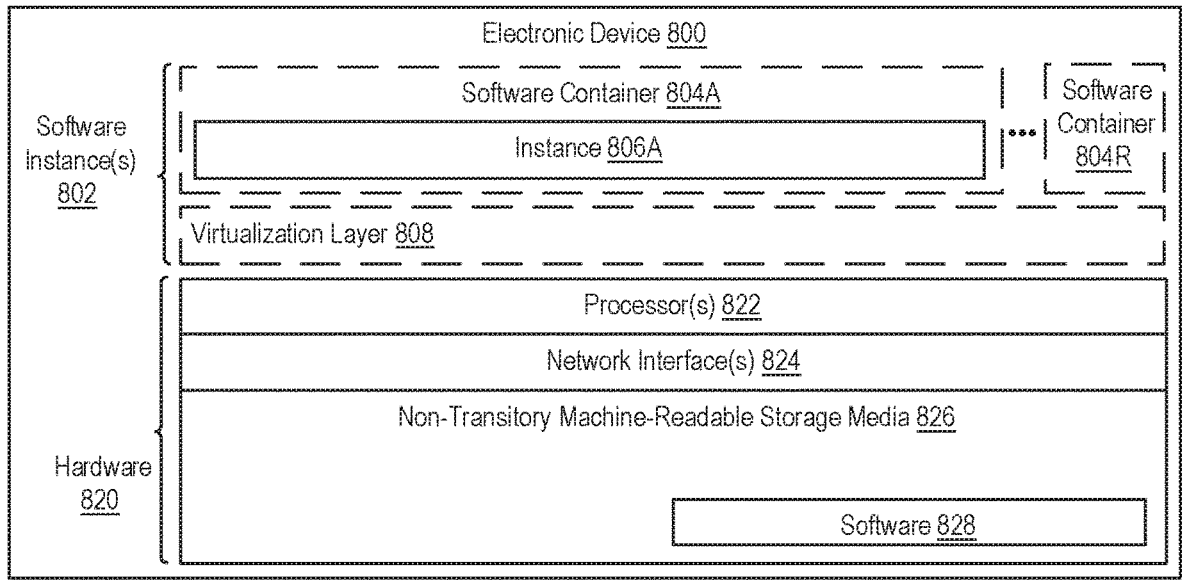
FIG. 8A is a diagram illustrating an electronic device according to some example implementations.

FIG. 8A is a block diagram illustrating an electronic device 800 according to some example implementations. FIG. 8A includes hardware 820 comprising a set of one or more processor(s) 822, a set of one or more network interfaces 824 (wireless and/or wired), and non-transitory machine-readable storage media 826 having stored therein software 828 (which includes instructions executable by the set of one or more processor(s) 822). One or more implementations described herein may be implemented as a service (e.g., a change management service 125). Each of the previously described clients and the change management service 125 may be implemented in one or more electronic devices 800. In some implementations, the change management service 125 may include the rule repository 156 and the rules engine 150. In other implementations, one or both of the rule repository 156 and the rules engine 150 are implemented as separate services to the change management service 125. In one implementation the change management service 125 is available to one or more clients (such as electronic device 110). In one implementation: 1) each of the clients is implemented in a separate one of the electronic devices 800 (e.g., in end user devices where the software 828 represents the software to implement clients to interface directly and/or indirectly with the change management service 125 (e.g., software 828 represents a web browser, a native client, a portal, a command-line interface, and/or an application programming interface (API) based upon protocols such as Simple Object Access Protocol (SOAP), Representational State Transfer (REST), etc.)); 2) the change management service 125 is implemented in a separate set of one or more of the electronic devices 800 (e.g., a set of one or more server devices where the software 828 represents the software to implement the change management service 125); and 3) in operation, the electronic devices implementing the clients and the change management service 125 would be communicatively coupled (e.g., by a network) and would establish between them (or through one or more other layers and/or or other services) connections for submitting requests 115 to the change management service 125 and returning descriptions of changes 195 to the clients. Other configurations of electronic devices may be used in other implementations (e.g., an implementation in which the client and the change management service 125 are implemented on a single electronic device 800).

During operation an instance of the software 828 (illustrated as instance 806A and also referred to as a software instance; and in the more specific case of an application, as an application instance) is executed. In electronic devices that use compute virtualization, the set of one or more processor(s) 822 typically execute software to instantiate a virtualization layer 808 and software container(s) 804A-R (e.g., with operating system-level virtualization, the virtualization layer 808 may represent a container engine (such as Docker Engine by Docker, Inc. or rkt in Container Linux by Red Hat, Inc.) running on top of (or integrated into) an operating system, and it allows for the creation of multiple software containers 804A-R (representing separate user space instances and also called virtualization engines, virtual private servers, or jails) that may each be used to execute a set of one or more applications; with full virtualization, the virtualization layer 808 represents a hypervisor (sometimes referred to as a virtual machine monitor (VMM)) or a hypervisor executing on top of a host operating system, and the software containers 804A-R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation an instance of the software 828 is executed within the software container 804A on the virtualization layer 808. In electronic devices where compute virtualization is not used, the instance 806A on top of a host operating system is executed on the "bare metal" electronic device 800. The instantiation of the instance 806A, as well as the virtualization layer 808 and software containers 804A-R if implemented, are collectively referred to as software instance(s) 802.

Alternative implementations of an electronic device may have numerous variations from that described above. For example, customized hardware and/or accelerators might also be used in an electronic device.

Example Environment

Figure 8B:
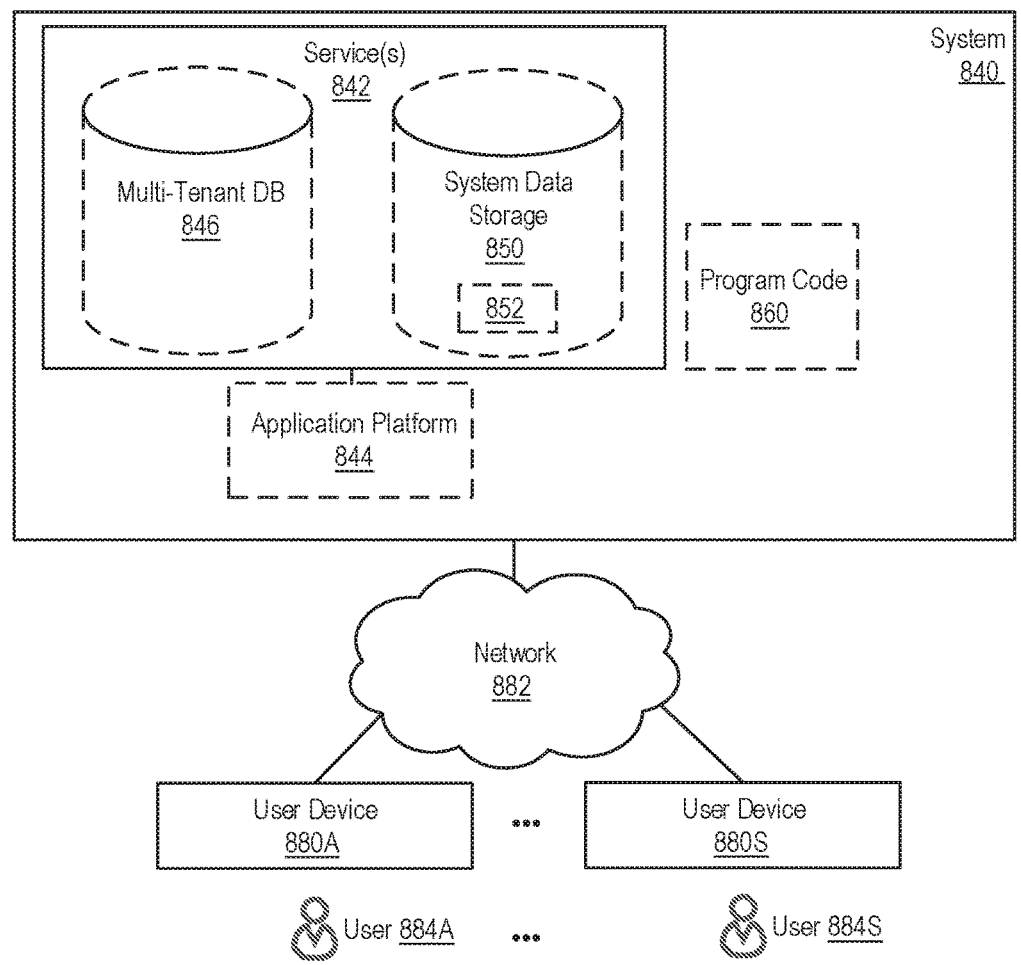
FIG. 8B is a block diagram of a deployment environment according to some example implementations.

FIG. 8B is a block diagram of a deployment environment according to some example implementations. A system 840 includes hardware (e.g., a set of one or more server devices) and software to provide service(s) 842, including the change management service 125. In some implementations the system 840 is in one or more datacenter(s). These datacenter(s) may be: 1) first party datacenter(s), which are datacenter(s) owned and/or operated by the same entity that provides and/or operates some or all of the software that provides the service(s) 842; and/or 2) third party datacenter(s), which are datacenter(s) owned and/or operated by one or more different entities than the entity that provides the service(s) 842 (e.g., the different entities may host some or all of the software provided and/or operated by the entity that provides the service(s) 842). For example, third party datacenters may be owned and/or operated by entities providing public cloud services (e.g., Amazon.com, Inc. (Amazon Web Services), Google LLC (Google Cloud Platform), Microsoft Corporation (Azure)).

The system 840 is coupled to user devices 880A-S over a network 882. The service(s) 842 may be on-demand services that are made available to one or more of the users 884A-S working for one or more entities other than the entity which owns and/or operates the on-demand services (those users sometimes referred to as outside users) so that those entities need not be concerned with building and/or maintaining a system, but instead may make use of the service(s) 842 when needed (e.g., when needed by the users 884A-S). The service(s) 842 may communicate with each other and/or with one or more of the user devices 880A-S via one or more APIs (e.g., a REST API). The user devices 880A-S are operated by users 884A-S.

In some implementations the system 840 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 840 is a multi-tenant cloud computing architecture supporting multiple services, such as one or more of the following:

| Type of Service | Example Service(s) by salesforce.com, inc. |
| --- | --- |
| Customer relationship management (CRM) | Sales Cloud |
| Configure, price, quote (CPQ) | CPQ and Billing |
| Business process modeling (BPM) | Process Builder |
| Customer support | Service Cloud, Field Service Lightning |
| Marketing | Commerce Cloud Digital, Commerce Cloud Order Management, Commerce Cloud Store |
| External data connectivity | Salesforce Connect |
| Productivity | Quip |

| Type of Service | Example Service(s) by salesforce.com, inc. |
| --- | --- |
| Database-as-a-Service | Database.com ™ |
| Data-as-a-Service (DAAS or DaaS) | Data.com |
| Platform-as-a-service (PAAS or PaaS) | Heroku ™ Enterprise, Thunder, Force.com ®, Lightning, Change Management Service |
| Infrastructure-as-a-Service (IAAS or IaaS) (e.g., virtual machines, servers, and/or storage) | |
| Analytics | Einstein Analytics, Sales Analytics, Service Analytics |
| Community | Community Cloud, Chatter |
| Internet-of-Things (IoT) | Salesforce IoT, IoT Cloud |
| Industry-specific | Financial Services Cloud, Health Cloud |
| Artificial intelligence (AI) | Einstein |
| Application marketplace ("app store") | AppExchange, AppExchange Store Builder |
| Data modeling | Schema Builder |
| Security | Salesforce Shield |
| Identity and access management (IAM) | Field Audit Trail, Platform Encryption, IT Governance, Access Management, Salesforce Identity, Salesforce Authenticator |

For example, system 840 may include an application platform 844 that enables PAAS for creating, managing, and executing one or more applications developed by the provider of the application platform 844, users accessing the system 840 via one or more of user electronic devices 880A-S, or third-party application developers accessing the system 840 via one or more of user electronic devices 880A-S.

In some implementations, one or more of the service(s) 842 may use one or more multi-tenant databases 846, as well as system data storage 850 for system data 852 accessible to system 840. In certain implementations, the system 840 includes a set of one or more servers that are running on server electronic devices and that are configured to handle requests for any authorized user associated with any tenant (there is no server affinity for a user and/or tenant to a specific server). The user electronic device 880A-S communicate with the server(s) of system 840 to request and update tenant-level data and system-level data hosted by system 840, and in response the system 840 (e.g., one or more servers in system 840) automatically may generate one or more Structured Query Language (SQL) statements (e.g., one or more SQL queries) that are designed to access the desired information from the one or more multi-tenant database 846 and/or system data storage 850.

In some implementations, the service(s) 842 are implemented using virtual applications dynamically created at run time responsive to queries from the user electronic devices 880A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 860 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 844 includes an application setup mechanism that supports application developers' creation and management of applications, which may be saved as metadata by save routines. Invocations to such applications, including the change management service 125, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 882 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 840 and the user electronic devices 880A-S.

Each user electronic device 880A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 840. For example, the user interface device can be used to access data and applications hosted by system 840, and to perform searches on stored data, and otherwise allow a user 884 to interact with various GUI pages that may be presented to a user 884. User electronic devices 880A-S might communicate with system 840 using TCP/IP (Transfer Control Protocol and Internet Protocol) and, at a higher network level, use other networking protocols to communicate, such as HyperText Transfer Protocol (HTTP), Andrew File System (AFS), Wireless Application Protocol (WAP), File Transfer Protocol (FTP), Network File System (NFS), an application program interface (API) based upon protocols such as SOAP, REST, etc. In an example where HTTP is used, one or more user electronic devices 880A-S might include an HTTP client, commonly referred to as a "browser," for sending and receiving HTTP messages to and from server(s) of system 840, thus allowing users 884 of the user electronic device 880A-S to access, process and view information, pages and applications available to it from system 840 over network 882.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," "some implementations," "other implementations," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method performed by an electronic device, the method comprising:
    retrieving, from a first computing environment, a first set of structured documents that contains metadata for a first version of a workflow to be performed by a workflow engine, the first version of the workflow including a first set of workflow elements, where each workflow element in the first set of workflow elements represents a respective operation having a respective type of a plurality of types, wherein the operation defines an action or decision to be performed by the workflow engine;
    retrieving, from a second computing environment, a second set of structured documents that contains metadata for a second version of the workflow, the second version of the workflow including a second set of workflow elements that differs from the first set of workflow elements, where each workflow element in the second set of workflow elements represents a respective operation having a respective type of the plurality of types, wherein the operation defines an action or decision to be performed by the workflow engine; and
    processing a rule of a plurality of rules, the processing including:
        determining whether the rule is to be applied, based on one but not both of the first and second sets of structured documents including at least one section for a workflow element representing a first operation of a first type, of the plurality of types, to which the rule applies,
        responsive to determining that the rule is to be applied, applying the rule to the first and second sets of structured documents to generate a description of a change in the second version of the workflow relative to the first version of the workflow; and
    generating a description of changes in the second version of the workflow relative to the first version of the workflow based on the descriptions generated by the applied rule.

2. The method of claim 1, wherein the description of changes relates to differences between the first and second sets of workflow elements.

3. The method of claim 1, the method further comprising:
    processing another rule of the plurality of rules, the processing another rule including:
        determining whether the another rule is to be applied, based on one but not both of the first and second sets of structured documents including at least one section for a workflow element representing a second operation of a second type, of the plurality of types, to which the another rule applies, and
        responsive to determining that the another rule is to be applied, applying the another rule to the first and second sets of structured documents to generate another description of a change in the second version of the workflow relative to the first version of the workflow, wherein the description of changes in the second version of the workflow relative to the first version of the workflow is an aggregation of the descriptions generated by the rule and the another rule.

4. The method of claim 1, wherein the second version of the workflow is a modified version of the first version of the workflow.

5. The method of claim 1, wherein the description of changes in the second version of the workflow relative to the first version of the workflow is a textual description.

6. The method of claim 1, further comprising:
    causing to be presented to a user, via a graphical user interface, the description of changes in the second version of the workflow relative to the first version of the workflow.

7. The method of claim 1, wherein the first set of structured documents includes a different number of documents than the second set of structured documents.

8. The method of claim 1, wherein the determining whether the rule is to be applied is further based on whether one or more filenames of the structured documents of the first and second sets of structured documents satisfy a regular expression.

9. A non-transitory machine-readable storage medium that provides instructions that, when executed by a processor, are capable of causing the processor to perform operations comprising:
    retrieving, from a first computing environment, a first set of structured documents that contains metadata for a first version of a workflow to be performed by a workflow engine, the first version of the workflow including a first set of workflow elements, where each workflow element in the first set of workflow elements represents a respective operation having a respective type of a plurality of types, wherein the operation defines an action or decision to be performed by the workflow engine;
    retrieving, from a second computing environment, a second set of structured documents that contains metadata for a second version of the workflow, the second version of the workflow including a second set of workflow elements that differs from the first set of workflow elements, where each workflow element in the second set of workflow elements represents a respective operation having a respective type of the plurality of types, wherein the operation defines an action or decision to be performed by the workflow engine; and
    processing a rule of a plurality of rules, the processing including:
        determining whether the rule is to be applied, based on one but not both of the first and second sets of structured documents including at least one section for a workflow element representing a first operation of a first type, of the plurality of types, to which the rule applies,
        responsive to determining that the rule is to be applied, applying the rule to the first and second sets of structured documents to generate a description of a change in the second version of the workflow relative to the first version of the workflow; and
        generating a description of changes in the second version of the workflow relative to the first version of the workflow based on the descriptions generated by the applied rule.

10. The non-transitory machine-readable storage medium of claim 9, wherein the description of changes relates to differences between the first and second sets of workflow elements.

11. The non-transitory machine-readable storage medium of claim 9, that further provides instructions that, when executed by the processor, are capable of causing said processor to perform further operations comprising:
    processing another rule of the plurality of rules, the processing another rule including:
        determining whether the another rule is to be applied, based on one but not both of the first and second sets of structured documents including at least one section for a workflow element representing a second operation of a second type, of the plurality of types, to which the another rule applies, and
        responsive to determining that the another rule is to be applied, applying the another rule to the first and second sets of structured documents to generate another description of a change in the second version of the workflow relative to the first version of the workflow, wherein the description of changes in the second version of the workflow relative to the first version of the workflow is an aggregation of the descriptions generated by the rule and the another rule.

12. The non-transitory machine-readable storage medium of claim 9, wherein the second version of the workflow is a modified version of the first version of the workflow.

13. The non-transitory machine-readable storage medium of claim 9, wherein the description of changes in the second version of the workflow relative to the first version of the workflow is a textual description.

14. The non-transitory machine-readable storage medium of claim 9, that further provides instructions that, when executed by the processor, are capable of causing said processor to perform further operations comprising:
    causing to be presented to a user, via a graphical user interface, the description of changes in the second version of the workflow relative to the first version of the workflow.

15. The non-transitory machine-readable storage medium of claim 9, wherein the first set of structured documents includes a different number of documents than the second set of structured documents.

16. The non-transitory machine-readable storage medium of claim 9, wherein the determining whether the rule is to be applied is further based on whether one or more filenames of the structured documents of the first and second sets of structured documents satisfy a regular expression.

17. A system comprising:
    a non-transitory machine-readable storage medium that stores a change management service; and
    a processor coupled to the non-transitory machine-readable storage medium, the processor to execute the change management service, the change management service to:
        retrieve, from a first computing environment, a first set of structured documents that contains metadata for a first version of a workflow to be performed by a workflow engine, the first version of the workflow including a first set of workflow elements, where each workflow element in the first set of workflow elements represents a respective operation having a respective type of a plurality of types, wherein the operation defines an action or decision to be performed by the workflow engine, retrieve, from a second computing environment, a second set of structured documents that contains metadata for a second version of the workflow, the second version of the workflow including a second set of workflow elements that differs from the first set of workflow elements, where each workflow element in the second set of workflow elements represents a respective operation having a respective type of the plurality of types, wherein the operation defines an action or decision to be performed by the workflow engine, and process a rule of a plurality of rules, including to determine whether the rule is to be applied, based on one but not both of the first and second sets of structured documents including at least one section for a workflow element representing a first operation of a first type, of the plurality of types, to which the rule applies, and responsive to determining that the rule is to be applied, to apply the rule to the first and second sets of structured documents to generate a description of a change in the second version of the workflow relative to the first version of the workflow, and to generate a description of changes in the second version of the workflow relative to the first version of the workflow based on the descriptions generated by the applied rule.

18. The system of claim 17, wherein the description of changes relates to differences between the first and second sets of workflow elements.

19. The system of claim 17, wherein the second version of the workflow is a modified version of the first version of the workflow.

20. The system of claim 17, wherein the change management service is further to cause to be presented to a user, via a graphical user interface, the description of changes in the second version of the workflow relative to the first version of the workflow.

* * * * *